US008714142B2

(12) United States Patent  (10) Patent No.: US 8,714,142 B2
Jacob et al.  (45) Date of Patent: May 6, 2014

(54) CRANKCASE VENTILATION FILTER ASSEMBLY; COMPONENTS; AND METHODS

(75) Inventors: Gregoire Jacob, Les Contamines-Montjoie (FR); Robert Wood, Hoeilaart (BE)

(73) Assignee: Donaldson Company, Inc., Minneapolis, MN (US)

( * ) Notice: Subject to any disclaimer, the term of this patent is extended or adjusted under 35 U.S.C. 154(b) by 778 days.

(21) Appl. No.: 12/452,970

(22) PCT Filed: Jul. 31, 2008

(86) PCT No.: PCT/US2008/071783
§ 371 (c)(1),
(2), (4) Date: Sep. 22, 2010

(87) PCT Pub. No.: WO2009/018454
PCT Pub. Date: Feb. 5, 2009

(65) Prior Publication Data
US 2011/0017155 A1  Jan. 27, 2011

Related U.S. Application Data

(60) Provisional application No. 60/962,993, filed on Aug. 2, 2007.

(51) Int. Cl.
*F02B 25/06* (2006.01)
(52) U.S. Cl.
USPC .......................... 123/572; 123/573; 123/41.86
(58) Field of Classification Search
USPC ............. 123/572, 41.86, 573, 196 R, 196 CP
See application file for complete search history.

(56) References Cited

U.S. PATENT DOCUMENTS

| 3,164,141 A | 1/1965 | Jones |
| 3,186,391 A * | 6/1965 | Kennedy ........................ 123/572 |
| 3,232,437 A | 2/1966 | Hultgren |
| 3,263,402 A * | 8/1966 | Lindamood et al. ............ 96/339 |
| 3,344,923 A | 10/1967 | Pall et al. |
| 3,473,664 A | 10/1969 | Hultgren |
| 3,529,722 A | 9/1970 | Humbert, Jr. |

(Continued)

FOREIGN PATENT DOCUMENTS

| AU | 503758 | 9/1979 |
| CN | 2296402 Y | 3/1997 |

(Continued)

OTHER PUBLICATIONS

Invitation to Pay Additional Fees with Partial International Search mailed Nov. 11, 2010.

*Primary Examiner* — Noah Kamen
*Assistant Examiner* — Long T Tran
(74) *Attorney, Agent, or Firm* — Merchant & Gould P.C.

(57) ABSTRACT

Crankcase ventilation filter arrangements and components therefore are described. Example arrangements are described. In one, a serviceable filter cartridge includes a check valve therein, for protection during vehicle rollover. Handle arrangements are also described. An example filter cartridge is described in which media, surrounding an open interior, is positioned between first and second, opposite, end pieces. A first end piece has a projection on an opposite side from the media, the projection including framework having an upper rail supported by spaced supports. Methods of use are described.

21 Claims, 30 Drawing Sheets

(56) References Cited

U.S. PATENT DOCUMENTS

| | | | |
|---|---|---|---|
| 3,618,775 | A | 11/1971 | Hultgren |
| 3,628,662 | A | 12/1971 | Kudlaty |
| 3,633,750 | A | 1/1972 | Braun |
| 3,669,144 | A | 6/1972 | Pamai |
| 3,722,683 | A | 3/1973 | Shaltis et al. |
| 3,774,764 | A | 11/1973 | Baldwin |
| 3,785,491 | A | 1/1974 | Dudinec et al. |
| 3,822,787 | A | 7/1974 | Shaltis et al. |
| 3,837,495 | A | 9/1974 | Baldwin |
| 3,855,128 | A | 12/1974 | Shaltz et al. |
| 3,984,318 | A | 10/1976 | Bumb |
| 3,985,657 | A | 10/1976 | Coughlan |
| 4,011,846 | A | 3/1977 | Gagliardi |
| 4,035,306 | A | 7/1977 | Maddocks |
| 4,075,098 | A | 2/1978 | Paul et al. |
| 4,126,559 | A | 11/1978 | Cooper |
| 4,133,763 | A | 1/1979 | Cooper |
| 4,144,168 | A | 3/1979 | Thornton |
| 4,233,042 | A | 11/1980 | Tao |
| 4,242,368 | A | 12/1980 | Nagai et al. |
| 4,316,801 | A | 2/1982 | Cooper |
| 4,324,660 | A | 4/1982 | Peyton et al. |
| 4,369,113 | A | 1/1983 | Stifelman |
| 4,400,864 | A | 8/1983 | Peyton et al. |
| 4,581,135 | A | 4/1986 | Gerulis |
| 4,668,393 | A | 5/1987 | Stone |
| 4,740,299 | A | 4/1988 | Popoff et al. |
| 4,743,374 | A | 5/1988 | Stifelman |
| 4,853,118 | A | 8/1989 | Brownell et al. |
| 5,037,539 | A | 8/1991 | Hutchins et al. |
| 5,104,537 | A | 4/1992 | Stifelman |
| 5,250,176 | A | 10/1993 | Daniel |
| 5,579,744 | A | 12/1996 | Trefz |
| 5,702,602 | A | 12/1997 | Brown et al. |
| 5,716,517 | A | 2/1998 | Lasky |
| 5,753,120 | A | 5/1998 | Clausen et al. |
| 5,772,868 | A | 6/1998 | Reinhardt |
| 5,814,215 | A | 9/1998 | Bruss et al. |
| 5,853,439 | A | 12/1998 | Gieseke et al. |
| 5,855,783 | A | 1/1999 | Shucosky et al. |
| 5,895,568 | A | 4/1999 | Koltunov |
| D410,010 | S | 5/1999 | Gieseke et al. |
| 5,996,810 | A | 12/1999 | Bounnakhom et al. |
| D420,117 | S | 2/2000 | Gieseke et al. |
| 6,053,334 | A | 4/2000 | Popoff et al. |
| 6,058,917 | A * | 5/2000 | Knowles .................. 123/573 |
| 6,093,231 | A | 7/2000 | Read et al. |
| 6,123,061 | A * | 9/2000 | Baker et al. ................ 123/573 |
| 6,136,076 | A | 10/2000 | Read |
| 6,143,049 | A | 11/2000 | Gieseke et al. |
| D438,214 | S | 2/2001 | Gieseke et al. |
| 6,187,073 | B1 | 2/2001 | Gieseke et al. |
| D439,962 | S | 4/2001 | Gieseke et al. |
| D439,963 | S | 4/2001 | Gieseke et al. |
| D440,293 | S | 4/2001 | Gieseke et al. |
| 6,217,755 | B1 | 4/2001 | Stifelman et al. |
| 6,235,195 | B1 | 5/2001 | Tokar |
| 6,248,236 | B1 | 6/2001 | Hodgkins |
| 6,348,084 | B1 | 2/2002 | Gieseke et al. |
| 6,485,535 | B1 | 11/2002 | Linnersten et al. |
| 6,530,969 | B2 | 3/2003 | Gieseke et al. |
| 6,555,000 | B2 | 4/2003 | Knight |
| 6,557,536 | B2 | 5/2003 | Burgess |
| 6,572,667 | B1 | 6/2003 | Greif et al. |
| D476,725 | S | 7/2003 | Dushek et al. |
| 6,605,210 | B2 | 8/2003 | Reinhardt |
| 6,647,973 | B1 * | 11/2003 | Schueler et al. ............ 123/572 |
| 6,685,829 | B1 | 2/2004 | Baumann et al. |
| 6,733,666 | B1 | 5/2004 | Wilkendorf et al. |
| 6,752,924 | B2 | 6/2004 | Gustafson et al. |
| 6,782,917 | B2 | 8/2004 | Wolford et al. |
| 6,790,356 | B2 | 9/2004 | Wright et al. |
| 6,797,168 | B1 | 9/2004 | Knight |
| 6,852,148 | B2 | 2/2005 | Gieseke et al. |
| 6,907,869 | B2 | 6/2005 | Burgess et al. |
| 6,918,939 | B2 | 7/2005 | Dworatzek et al. |
| 6,936,084 | B2 | 8/2005 | Schlensker et al. |
| 6,949,189 | B2 | 9/2005 | Bassett et al. |
| 6,958,083 | B1 | 10/2005 | Schmitz et al. |
| 6,983,851 | B2 | 1/2006 | Maxwell et al. |
| 7,017,563 | B2 | 3/2006 | Dworatzek et al. |
| 7,070,642 | B2 | 7/2006 | Scott et al. |
| 7,081,145 | B2 | 7/2006 | Gieseke et al. |
| 7,182,804 | B2 | 2/2007 | Gieseke et al. |
| 7,257,942 | B2 * | 8/2007 | Schmeichel et al. ............ 60/283 |
| 7,278,259 | B2 | 10/2007 | Schmeichel et al. |
| 7,309,367 | B2 | 12/2007 | Heikamp et al. |
| 7,326,342 | B2 | 2/2008 | Richmond et al. |
| 7,407,148 | B2 | 8/2008 | Bassett et al. |
| 7,494,017 | B2 | 2/2009 | Miller |
| 7,531,018 | B2 | 5/2009 | Becker et al. |
| 7,537,631 | B2 | 5/2009 | Scott et al. |
| D601,238 | S | 9/2009 | Lundgren et al. |
| 7,607,289 | B2 | 10/2009 | Schmeichel et al. |
| 7,625,419 | B2 | 12/2009 | Nelson et al. |
| 7,648,546 | B2 | 1/2010 | Haberkamp et al. |
| 7,662,203 | B2 | 2/2010 | Scott et al. |
| 7,662,216 | B1 | 2/2010 | Terres et al. |
| 7,662,284 | B2 | 2/2010 | Greco et al. |
| D636,859 | S | 4/2011 | Lundgren et al. |
| 7,955,502 | B2 | 6/2011 | Greco et al. |
| 7,988,757 | B2 | 8/2011 | Scott et al. |
| 8,034,145 | B2 | 10/2011 | Boehrs et al. |
| 8,119,002 | B2 | 2/2012 | Schiavon et al. |
| 8,167,142 | B2 | 5/2012 | Hacker |
| 8,177,875 | B2 | 5/2012 | Rogers et al. |
| 8,177,976 | B2 | 5/2012 | Formica |
| 8,182,569 | B2 | 5/2012 | Casey et al. |
| 8,277,532 | B2 | 10/2012 | Reichter et al. |
| 8,292,983 | B2 | 10/2012 | Reichter et al. |
| D675,717 | S | 2/2013 | Lundgren et al. |
| 8,404,029 | B2 | 3/2013 | Lundgren et al. |
| 8,424,686 | B2 | 4/2013 | Ehrenberg et al. |
| 2001/0054418 | A1 | 12/2001 | Burgess |
| 2002/0040569 | A1 | 4/2002 | Reinhold et al. |
| 2002/0125188 | A1 | 9/2002 | Hacker et al. |
| 2002/0166805 | A1 | 11/2002 | Minns et al. |
| 2002/0170279 | A1 | 11/2002 | Gustafson et al. |
| 2003/0051455 | A1 | 3/2003 | Gieseke et al. |
| 2003/0127384 | A1 | 7/2003 | Kapur |
| 2003/0226790 | A1 | 12/2003 | Brown et al. |
| 2004/0035097 | A1 | 2/2004 | Schlensker et al. |
| 2004/0035403 | A1 | 2/2004 | Bedkowski et al. |
| 2004/0079693 | A1 | 4/2004 | Hacket et al. |
| 2004/0139734 | A1 * | 7/2004 | Schmeichel et al. ............ 60/283 |
| 2004/0182777 | A1 | 9/2004 | Stankowski et al. |
| 2005/0000876 | A1 | 1/2005 | Knight |
| 2005/0000885 | A1 | 1/2005 | Stockbower |
| 2005/0035053 | A1 | 2/2005 | Engelhard et al. |
| 2005/0072721 | A1 | 4/2005 | Knight |
| 2005/0193694 | A1 | 9/2005 | Gieseke et al. |
| 2005/0211232 | A1 | 9/2005 | Dushek et al. |
| 2005/0235617 | A1 | 10/2005 | Read |
| 2006/0006124 | A1 | 1/2006 | Yates et al. |
| 2006/0054547 | A1 | 3/2006 | Richmond et al. |
| 2006/0086075 | A1 | 4/2006 | Scott et al. |
| 2006/0137316 | A1 | 6/2006 | Krull et al. |
| 2006/0157403 | A1 | 7/2006 | Harder et al. |
| 2006/0186031 | A1 | 8/2006 | Fick et al. |
| 2006/0207948 | A1 * | 9/2006 | Hacker et al. .................. 210/791 |
| 2007/0084157 | A1 | 4/2007 | Heilkamp et al. |
| 2007/0157589 | A1 | 7/2007 | Haberkamp et al. |
| 2007/0163945 | A1 | 7/2007 | Ehrenberg et al. |
| 2008/0035103 | A1 * | 2/2008 | Barris et al. ............. 123/198 E |
| 2008/0142426 | A1 | 6/2008 | Greco et al. |
| 2008/0245717 | A1 | 10/2008 | Heikamp |
| 2008/0257161 | A1 | 10/2008 | Read |
| 2008/0307759 | A1 | 12/2008 | Reichter et al. |
| 2009/0020465 | A1 | 1/2009 | Jiang et al. |
| 2009/0071111 | A1 | 3/2009 | Lundgren et al. |
| 2009/0145095 | A1 | 6/2009 | Juliar et al. |
| 2009/0183717 | A1 | 7/2009 | Gillenberg et al. |
| 2010/0031940 | A1 | 2/2010 | Mosset et al. |
| 2010/0154371 | A1 | 6/2010 | Bittle et al. |

(56) References Cited

U.S. PATENT DOCUMENTS

| | | |
|---|---|---|
| 2010/0218682 A1 | 9/2010 | Hammerschick |
| 2011/0017657 A1 | 1/2011 | Jokschas et al. |
| 2011/0030629 A1 | 2/2011 | Schleiden |
| 2011/0108014 A1 | 5/2011 | Schleiden et al. |
| 2011/0154790 A1 | 6/2011 | Israel et al. |
| 2011/0258975 A1 | 10/2011 | Lundgren et al. |

FOREIGN PATENT DOCUMENTS

| | | |
|---|---|---|
| DE | 3405719 | 8/1985 |
| DE | 1 99 44 344 | 3/2000 |
| DE | 101 13 179 | 9/2002 |
| EP | 1 008 375 | 7/1999 |
| FR | 2 796 567 | 1/2001 |
| GB | 1 482 485 | 2/1975 |
| GB | 2 033 247 | 5/1980 |
| GB | 2 056 873 | 8/1980 |
| GB | 2 106 410 A | 4/1983 |
| GB | 1 604 832 | 3/1997 |
| GB | 2 364 256 | 5/2000 |
| WO | WO 99/47211 | 9/1999 |
| WO | WO 2004/045743 A1 | 6/2004 |
| WO | WO 2005/082488 | 9/2005 |
| WO | WO 2007/009039 | 1/2007 |
| WO | WO 2007/053411 A2 | 5/2007 |

\* cited by examiner

CRANKCASE VENTILATION FILTER ASSEMBLY; COMPONENTS; AND METHODS

CROSS-REFERENCE TO RELATED APPLICATION

This application is being filed on 29 Jan. 2010, as a US National Stage of PCT International Patent application No. PCT/US2008/071783, filed 31 Jul. 2008 in the name of Donaldson Company, Inc., a U.S. national corporation, applicant for the designation of all countries except the US, and Gregoire Jacob and Robert Wood, both citizens of Belgium, applicants for the designation of the US only, and claims priority to U.S. Provisional patent application Ser. No. 60/962,993, filed Aug. 2, 2007, and which applications are incorporated herein by reference. To the extent appropriate, a claim of priority is made to each of the above disclosed applications.

The above referenced application, includes, with edits, the disclosure of U.S. provisional application 60/962,993, filed Aug. 2, 2007. The complete disclosure of U.S. 60/962,993 is incorporated herein by reference. A claim of priority to 60/962,993 is made, to the extent appropriate.

FIELD OF DISCLOSURE

This disclosure relates to systems and methods for separating hydrophobic fluids (such as oils) which are entrained as aerosols, from gas streams (for example air streams). Further, the arrangements also provide for filtration of other contaminants such as carbon material, from gas streams. The arrangements are typically used to filter crankcase ventilation gases from engine systems. Methods for conducting the separations are also provided.

BACKGROUND

Certain gas streams, such as engine blow by gases (i.e. crankcase ventilation gases from the crankcases of diesel engines) carry substantial amounts of entrained oils (liquid) therein, as aerosol. In some instances, many of the oil (liquid) droplets within the aerosol are within the size of 0.1-5.0 microns.

In addition, such gas streams also carry substantial amounts of fine particulate contaminants, such as carbon contaminants. Such contaminants often have an average particle size within the range of about 0.5-3.0 microns.

In some instances, it is desired to vent such gases to the atmosphere. In general, it is preferred that before the gases are vented to the atmosphere, they be cleaned of a substantial portion of aerosol and/or organic particulate containment therein.

In other instances, it is desirable to direct to air gas stream into equipment. When such is the case, it may desirable to separate aerosolized liquids and/or particulates from the stream during circulation, in order to provide such benefits as: reduced negative effects on the downstream equipment; improved efficiency; recapture of otherwise lost oil; and/or to address environmental concerns.

Improvements in crankcase ventilation filter systems (i.e. blow by gas filtration systems) constructed for application with a variety of engine or equipment systems, are generally sought.

SUMMARY OF THE DISCLOSURE

Crankcase ventilation filter arrangement is described, as well as components therefor. The crankcase ventilation filter arrangement includes a housing and serviceable filter cartridge. An example housing includes a cover assembly and a base (in an example a bowl), which are removably secured to another, for example with threaded arrangement. The filter cartridge is removably installed with an interior of the housing. In an example depicted, the filter cartridge includes a check valve assembly therein, for protection during vehicle rollover.

Other advantageous features of the filter cartridge are described. Examples include a handle arrangement mounted on one end of the filter cartridge, as well as structural detail to ensure proper fitting of the cartridge within the assembly. Also, methods of assembly are described.

It is noted that there is no requirement that an assembly or component include all of the features described herein, to obtain some advantage according to the present disclosure.

BRIEF DESCRIPTION OF THE DRAWINGS

FIG. 6 being taken along line 6-6, FIG. 7

FIG. 13 being taken along line 13-13, FIG. 10.

FIG. 14 being taken along line 14-14, FIG. 11.

FIG. 22 being taken along line 22-22, FIG. 20.

DETAILED DESCRIPTION

I. Crankcase Ventilation (CCV) Filter Assembly Features

A. General Features of the Assembly

Figure 1:
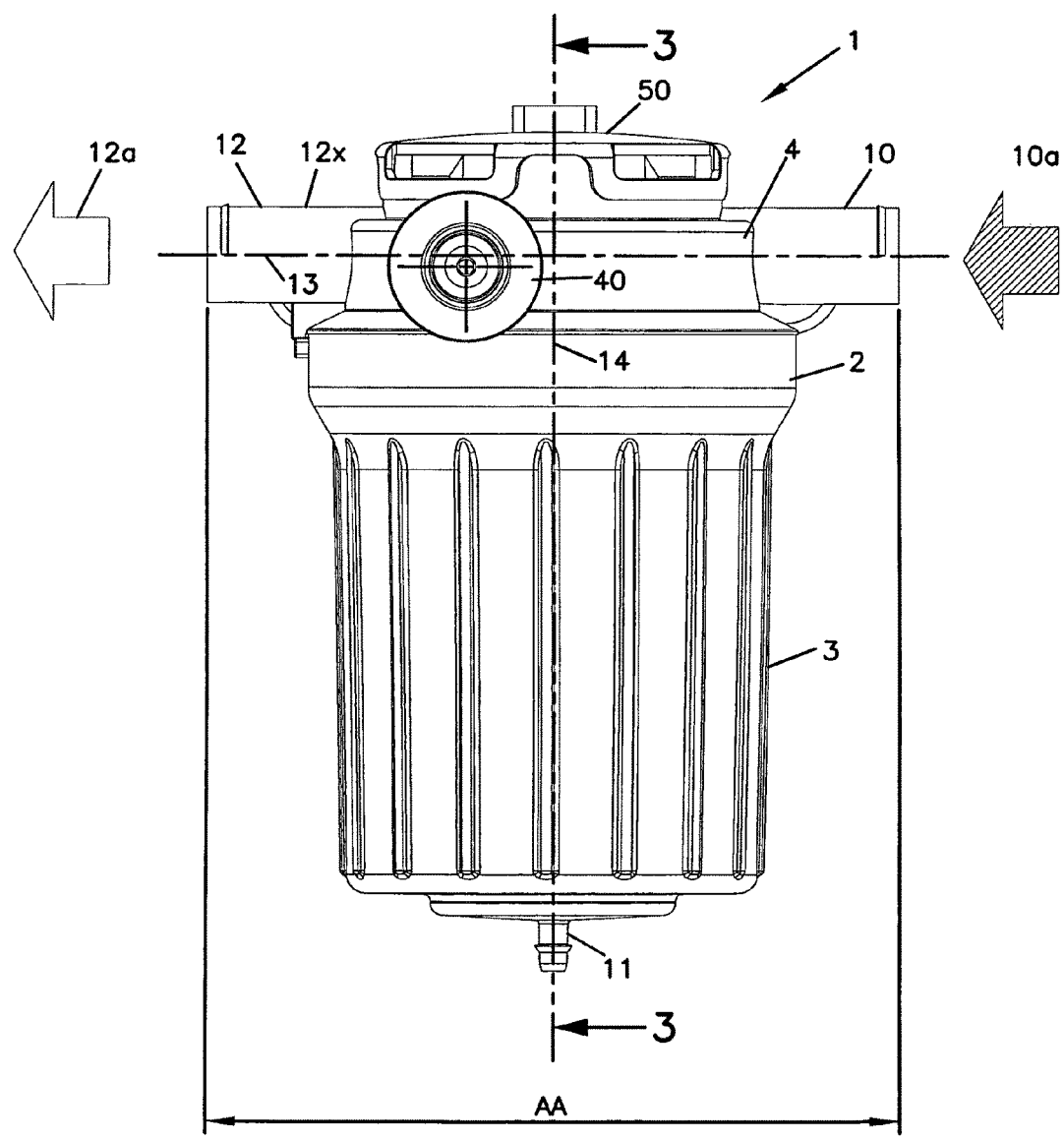
FIG. 1 is schematic side elevational view of the crankcase ventilation filtration assembly according to the present disclosure.

The reference numeral 1, FIG. 1, generally represents a crankcase ventilation filter assembly according to the present disclosure. The assembly 1, depicted in FIG. 1, includes a housing 2 defining a housing interior and including a housing base 3, a top cover or cover assembly 4 and an internally received, serviceable, i.e. removable and replaceable, filter cartridge service component, not depicted in FIG. 1 but shown in FIG. 5 at reference numeral 5.

In general, the housing 2 includes a gas flow inlet tube 10, a liquid drain outlet 11, and a gas flow outlet tube 12. For the example assembly 1 depicted in FIG. 1, the gas flow inlet tube 10 and the gas flow outlet tube 12 are positioned in the cover assembly 4; and, liquid drain outlet 11 is positioned in the housing base 3.

Referring to FIG. 1, it is noted for the example system, the gas flow inlet tube 10 and the gas flow outlet tube 12 are located at the same vertical height within the assembly 1. That is, line 13 is a center line for each of the gas flow inlet tube 10 and gas flow outlet tube 12, line 13 being generally perpendicular to a center vertical line 14 for the overall assembly 1 (when installed).

In use, blow by gases (crankcase ventilation gases) are directed into the assembly 1 through inlet tube 10, as shown at arrow 10a. Within the assembly 1, at least of portion of liquid particles (droplets) carried within the crankcase ventilation gases coalesce, and drain outwardly from the assembly 1 through the drain outlet 11, typically at least under gravity influence. The gases are filtered, and the outlet gases leave the assembly 1 through gas flow outlet tube 12, as shown at arrow 12a.

Figure 3:
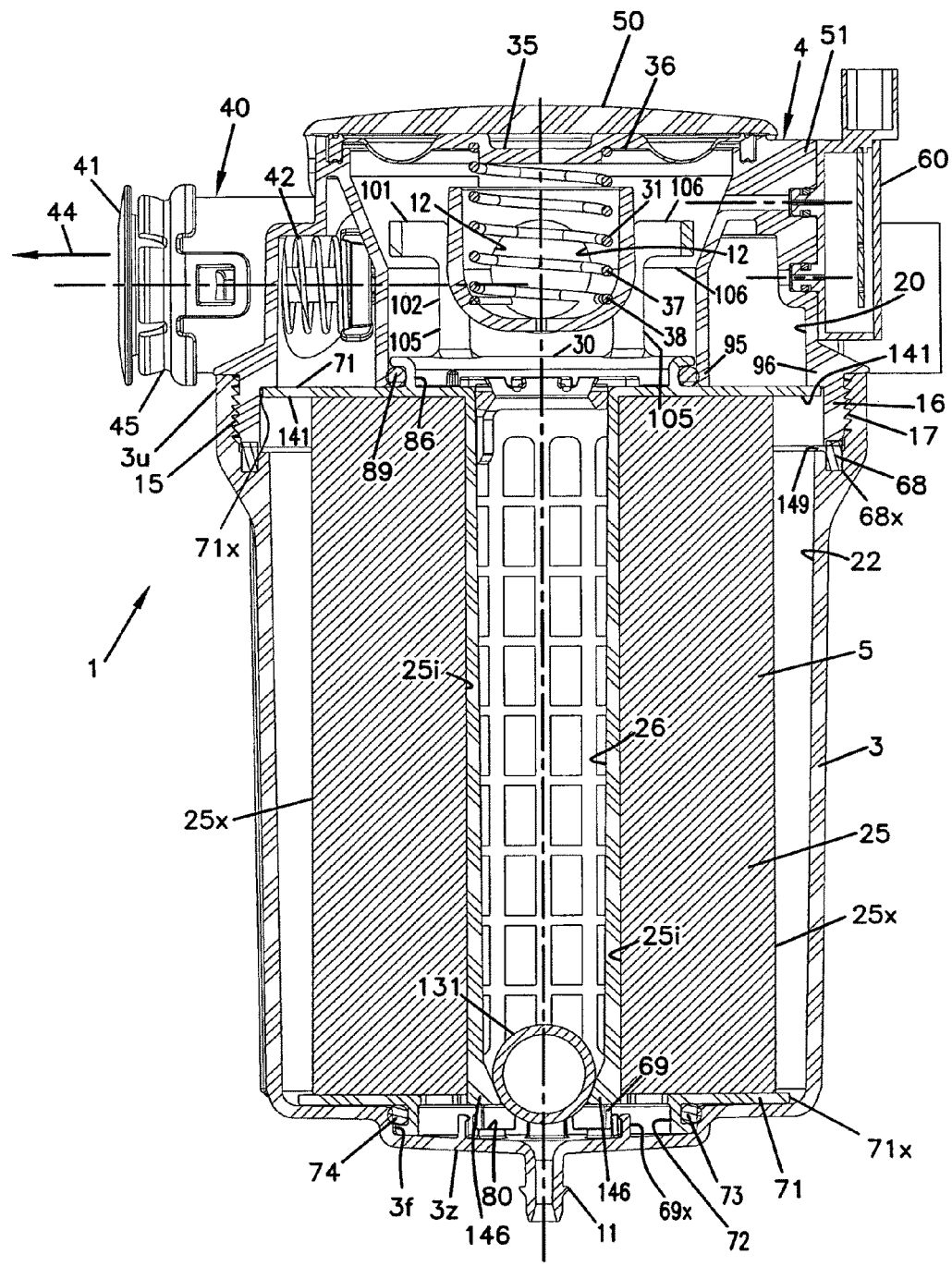
FIG. 3 is a schematic cross-sectional view taken generally along line 3-3 FIG. 1.

The base 3 is removable from the cover assembly 4. Referring to FIG. 3, the base 3 is provided with an open upper end 3u having threads (in the example, internal threads) 15 thereon. The cover assembly 4 includes a downwardly projecting flange 16 with threads (in the example shown, outer threads) 17 thereon. The bowl or base 3 is removably secured to the cover assembly 4 by threaded engagement between threads 3u on the base 3, and threads 17 on the cover assembly 4.

After a period of use, the internally cartridge received 5 will typically need to be serviced, for example by refurbishment or replacement. When such as the case: the base or bowl 3 is separated from the cover assembly 4; the cartridge 5 is removed from the assembly 1; and, a new or refurbished cartridge 5 is installed. Herein, a cartridge 5 which is removable and replaceable within the housing 2 is generally referred as a "serviceable" cartridge or by similar terms.

Referring to FIG. 3, when crankcase ventilation gases enter the assembly 1 via inlet tube 10 (FIG. 1) the gases are first directed into interior gas receiver region 20. From here, the gases are directed into annulus 22 surrounding cartridge 5. The gases are then passed through media 25 into cartridge open interior 26. The gases then pass from cartridge open interior 26 upwardly into volume 30 within cover assembly 4, surrounded by flange 95. The gases then pass into interior region 31 of outlet tube 12 and outwardly from assembly 1, FIG. 1. It is noted that on passage from volume 30 into interior region 31 of outlet tube 12, the gas flow is regulated by regulator arrangement 35 comprising diaphragm 36 and a biasing member 37. In this instance the biasing member 37 is shown as a coiled spring 38 nested within interior region 31 (of outlet flow tube 12) and against diaphragm 36.

In more general terms, outlet tube 12 includes an outer region 12x, FIG. 1 and an inner region 31, FIG. 3. Region 31 is generally u-shaped and operates as a flow channel to help direct air to outer region 12x. Herein, both sections 31 and 12x are referred to, together, as the outlet tube 12.

Referring still to FIG. 3, the assembly 1 includes a pressure relief valve assembly 40 thereon. The pressure release valve assembly 40, for the example shown, is configured to provide relief of pressure from within region 20, by venting to the atmosphere in the case of the pressure spike within assembly. This will provide for protection of engine gaskets and other equipment in the presence of pressure spikes within the system. The pressure relief valve assembly 40 comprises a relief valve member 41 biased closed under coiled spring 42, until an opening pressure is achieved, at which point valve member 41 will bias the direction of arrow 44, FIG. 3, opening valve opening 45 to release pressure there from.

Still referring to FIG. 3, the cover assembly 4 includes a top 50 positioned on frame piece 51. During assembly of cover assembly 4, before the top 50 is put in place, spring 38 and diaphragm 36 can be appropriately positioned. Then, when top 50 is positioned, the diaphragm 36 will be securely held in position, under an appropriate biasing pressure of spring 38

Still referring to FIG. 3, member 60 is shown to be secured on cover assembly 4. Member 60 is part of an electronic differential pressure sensor. It is positioned to measure pressure drop across the filter cartridge 5. It can be connected to equipment which is remote, (not shown), for measuring and reporting pressure differential. Member 60, then, can be used to determine when filter cartridge 5 needs to be replaced.

Figure 2:
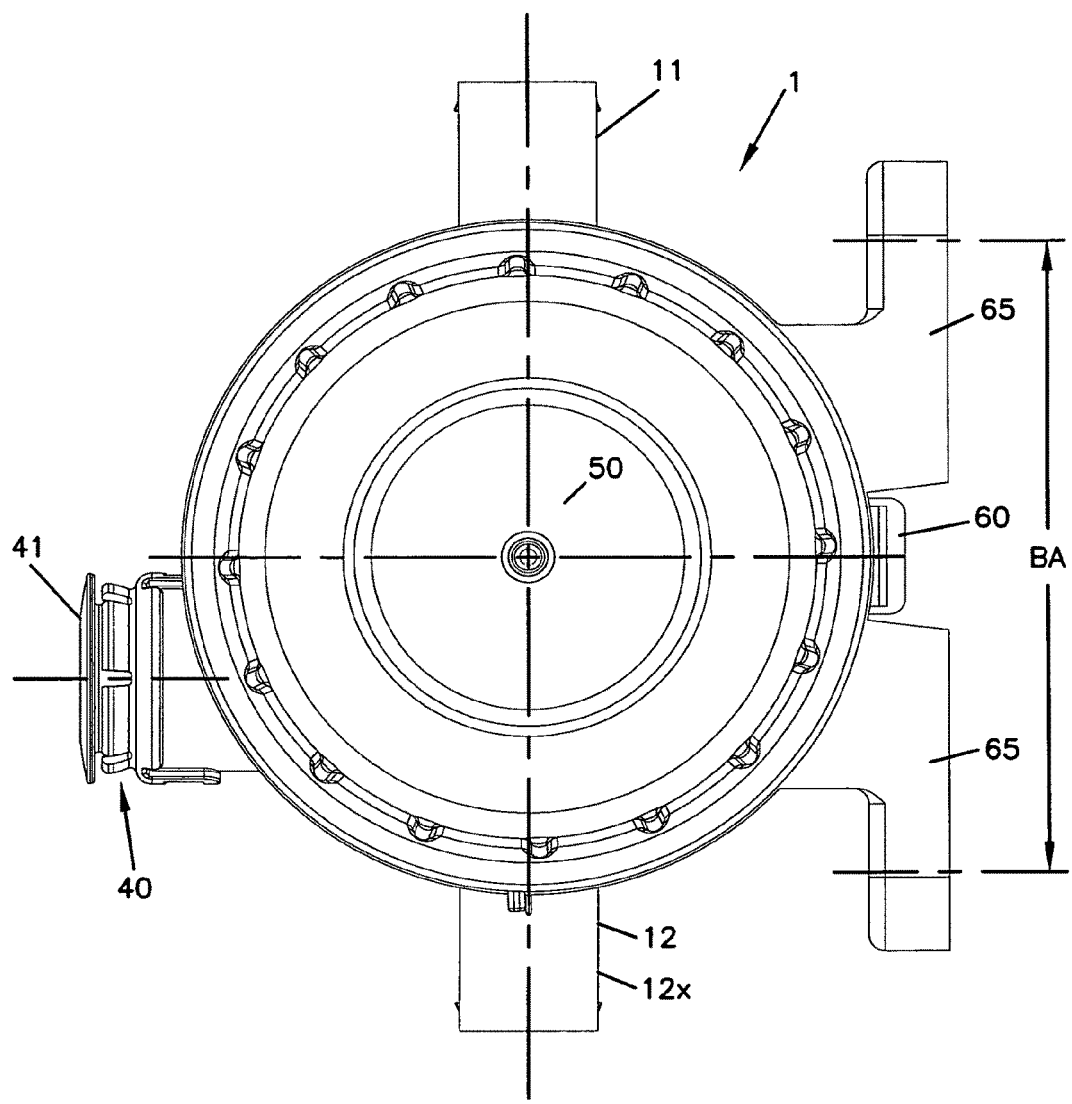
FIG. 2 is a schematic bottom plan view of the assembly depicted in FIG. 1.

Attention is now directed to FIG. 2, a top plan view of assembly 1. In FIG. 2, mounting pad arrangement 65 can be seen positioned cover assembly 4 for securing the assembly 1 in place on equipment. Since the cover assembly 4 is secured by the mounting pad arrangement 65, it will be understood that during normal servicing the bowl or base 3 will be threaded off (or onto) cover assembly 4; cover assembly 4 generally remaining secured in place.

Figure 4:
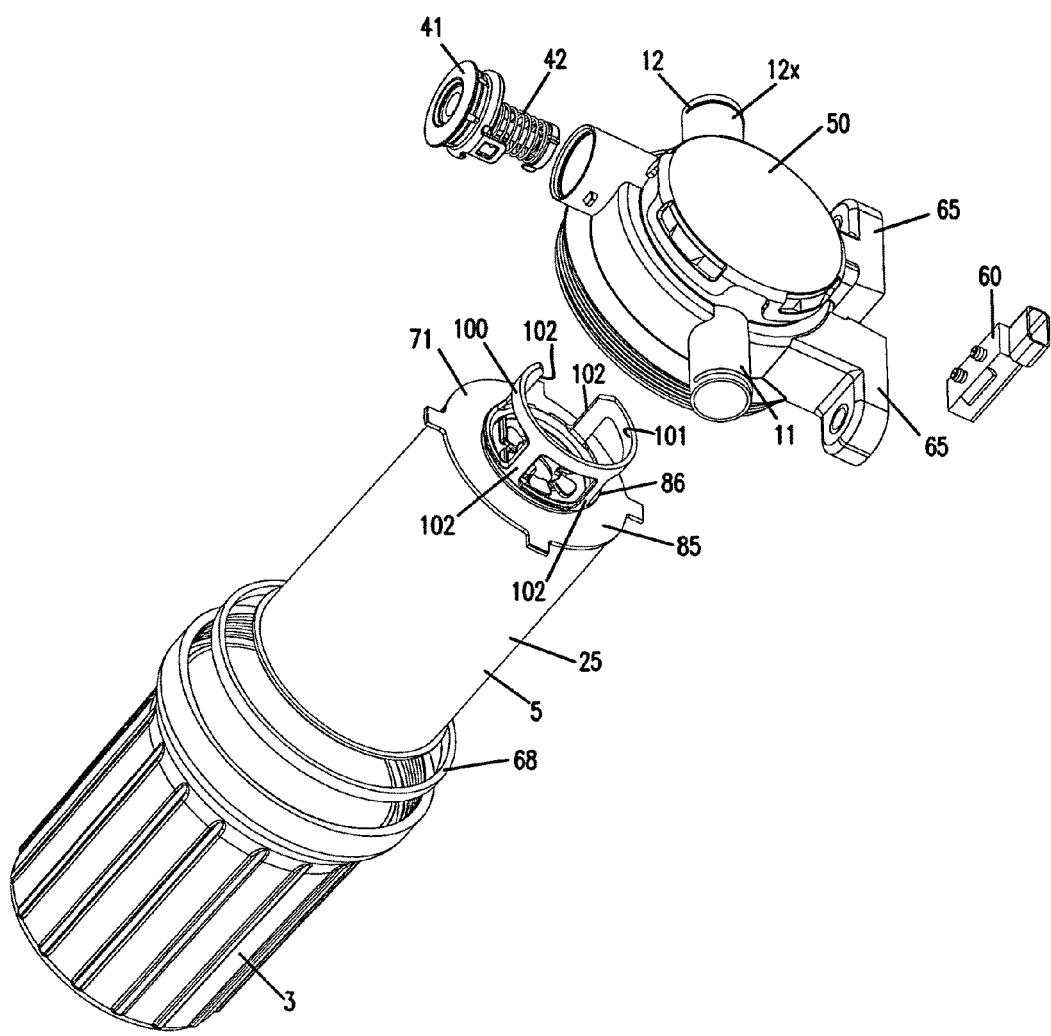
FIG. 4 is a schematic, exploded, perspective view of the assembly depicted in FIGS. 1-3.

Attention is now directed to FIG. 4, a perspective, partially exploded, view of assembly 1. Here, cover assembly 4 is viewable, with portion of pressure relief valve assembly 4 depicted in exploded view. Cartridge 5 can be seen. Seal member 68 will generally form a seal between bowl or base 3 and cover assembly 4, during assembly. In FIG. 3, seal ring 68 is depicted in cross-section, at a location where base 3 engages a bottom end of flange 16.

Referring again to FIG. 3, it is noted that cartridge 5 includes on a bottom thereof, downwardly projecting members 69 to engage upwardly projecting members 69x in bottom 3z of bowl 3. These can be used to help secure the cartridge 5 in place.

It is noted that in a typical use, a drain tube will be attached to outlet 11. The drain tube can be provided with a valve therein, to ensure the liquid won't flow back from the line into the assembly 1.

B. Cartridge Features

Figure 5:
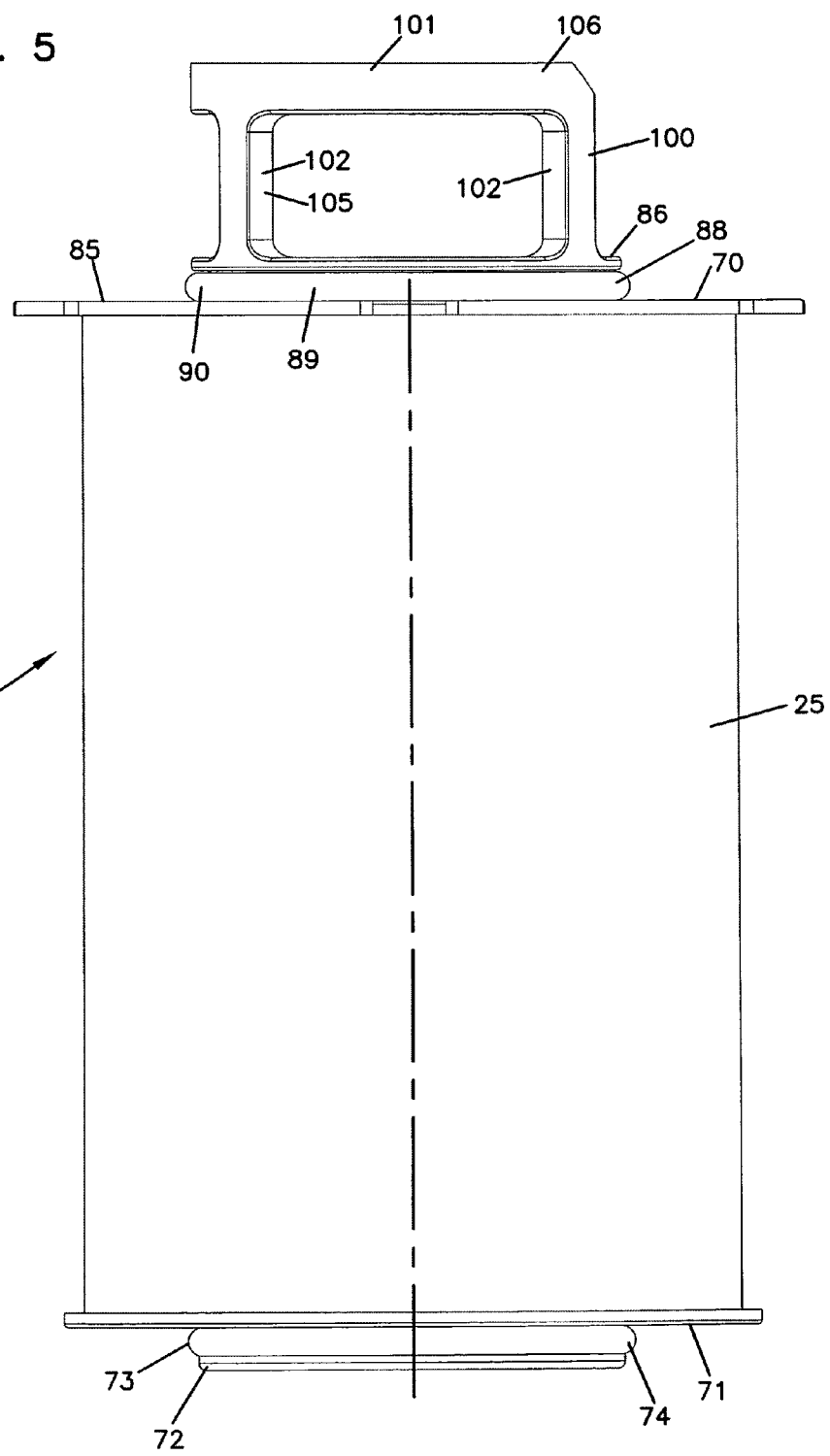
FIG. 5 is a schematic, side elevational view of a cartridge component usable in the assembly of FIGS. 1-4.
Figure 6:
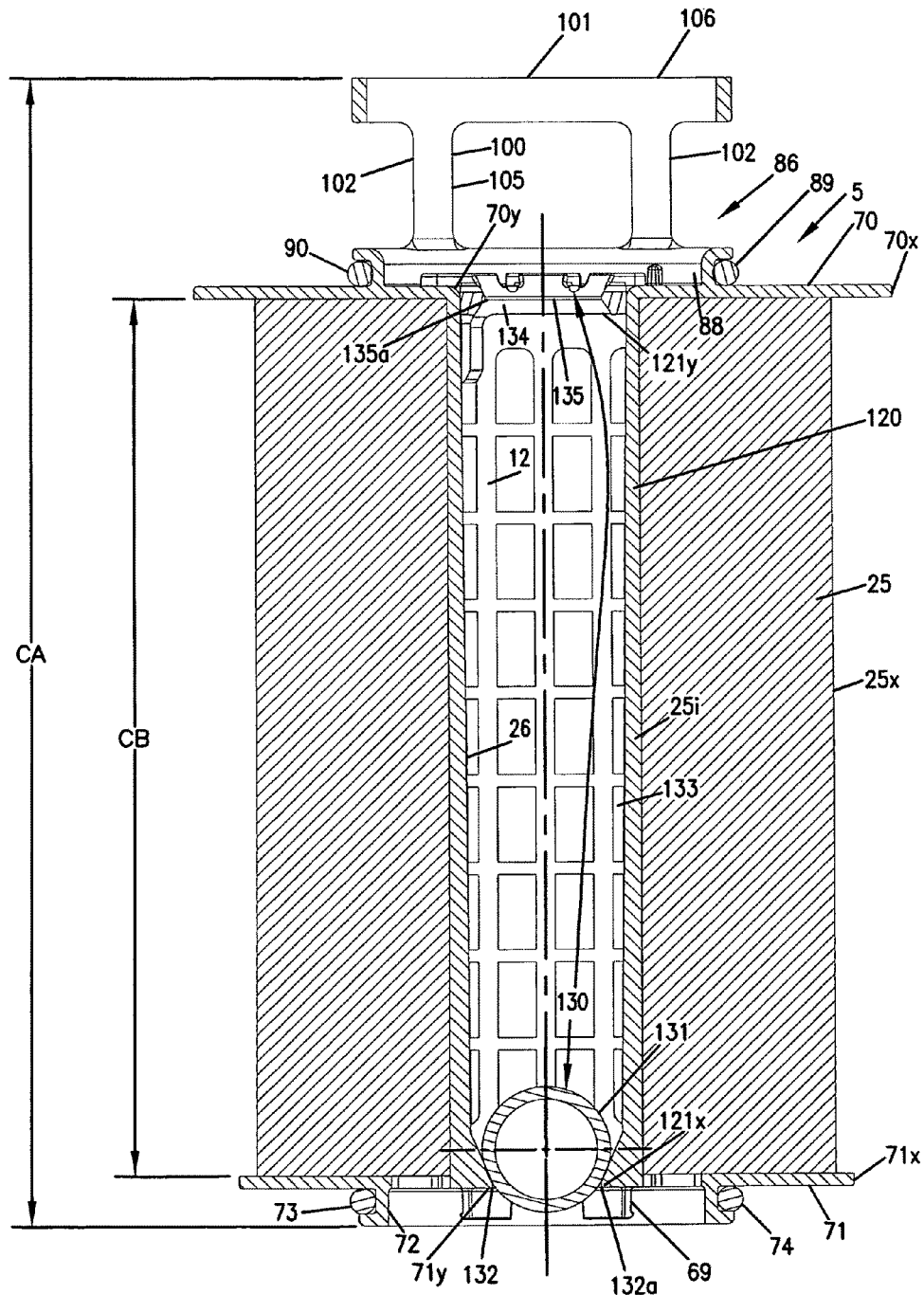
FIG. 6 is a schematic, cross-sectional view of the cartridge component of FIG. 5.

Attention is now directed to FIGS. 5 and 6, in which cartridge 5 is depicted separately from assembly 1. Referring first to FIG. 5, cartridge 5 comprises media pack 25. The media pack 25 is depicted positioned between first and second end pieces 70, 71. Second (lower) end piece 71 will generally be positioned directed downwardly in use. The second end piece 71 includes a central, axially projecting (downward), projection 72 thereon, around which seal member 73, in this instance comprising o-ring 74, is positioned. The term "axially projecting" in this context, when used in reference to projection 72, generally means projection 72 extends in a direction opposite end piece 70. When cartridge 5 is installed in the base 3, FIG. 3, seal member 73 is sealed to flange 3f, positioned as a bottom flange in base 3, adjacent to bottom 3b of the base 3. For the particular example shown, the o-ring 74 is positioned to provide an outwardly directed seal in engagement with flange 3f; flange 35 forming an annular flange around projection or seal support 72; in a bottom 3z of bowl 3.

Referring to FIG. 3, it is noted that flange 72, which supports o-ring 74, is spaced inwardly from outer peripheral rim 71x and end piece 71 and to support o-ring 74 (seal member 73 is inwardly from outer peripheral rim 71x). The projection 72, for the example shown, is spaced at least 20%, usually at 30% from across media pack 25 and outer edge 25x toward inner edge 25i and from inner edge 25i to outer edge 25x. This would be the typical location for support 72.

Still referring to FIG. 3 seal 73, in the form of o-ring 74, isolates annular region 22, from a liquid receiving region 80 adjacent outlet 11.

Referring again to FIG. 5, first (upper) end piece 70 will generally form a top end when cartridge 5 is positioned for use. First end piece 70 generally includes end ring 85 and axially projecting support 86. The term "axially projecting" in this context, when referred to support 86, generally means projection 86 extends from ring 85 in direction opposite end piece 71. Support 86 can be formed integral (along with ring 85) with a remainder of end piece 70 and typically will be. Support 86 includes a base section 88 positioned as a seal support, for seal member 89 (in the form of o-ring 90), extending there around. Referring to FIG. 3, when cartridge 5 is installed for use, seal member 89, i.e., o-ring 90, will engage central flange 95 in cover assembly 4, to form a seal therewith. In general, the seal is an outwardly directed radial seal, with flange 95 surrounding support 88.

Referring to FIG. 3, it is noted that support 86 or seal member 89 is positioned spaced from an outer peripheral 71x inwardly. Indeed referring to FIG. 3, support 86 position is spaced from outer edge 25x media pack 25 toward inner edge 25i. Typically, support 86 will be positioned at least 20% usually at least 30% of the distance across media pack 25 between edges 25x and 25i, from outer edge 25x and also from inner edge 25i, usually. Typically, flanges 72 and 86 will be positioned the same distance inwardly from edge 25x, although alternatives are possible.

Also typically, support 86 is positioned at least 20% across end piece 71 from an outer periphery 71x to a central aperture therethrough, from each of the central aperture and the outer periphery 71x.

In general, flange 95 and seal 89, separate inlet region 20 (in cover assembly 4), from filtered gas outlet region 30, thus requiring gas flow from inlet tube 10 to pass through media 25 of cartridge 5, before it can pass outwardly from outlet tube 12.

Referring again to FIG. 5, extending (projecting) axially from base seal support region 88, projection 86 includes framework 100 comprising an upper rail 101 and a support arrangement comprising spaced supports 102. The spaced supports 102 support rail 101 in extension spaced from base 88. The spaced supports 102 provide for airflow apertures 105 therebetween.

Referring to FIG. 3, air flow apertures 105 provide for flow of gases from region 26 within cartridge 5, through filtered gas region 30, into tube 31. In addition, rail 101 and apertures 105 provide for convenient handle arrangement 106 for handling cartridge 5 and positioning it within (or removing it from) bowl or base 3.

Referring to FIG. 3, it is noted that support 102 and upper rim 101 are generally positioned, on end cap 71, at a location spaced inwardly from outer edge 25x with the media pack 25, or toward inner edge 25i. Typically, rail 101 and supports 102 are positioned at least 20% across the media pack from edge 25x to edge 25i, usually at least 30%. This ensures that the rail 101 and supports 102, i.e. resulting handle arrangement 106 is surrounded by flange 95 during assembly, and is positioned within region 30, as intended.

Attention is now directed to FIG. 6. Referring to FIG. 6, for the example shown cartridge 5 comprises media pack 25 and support member 120. The support member 120 comprises central support 121 around which the media pack 25 extends. The central support 121 defines interior region 26. The support member 120 further includes end piece 71 with support 72 thereon. Further, it includes end piece 70 with ring 85 and projection 86 (comprising seal 88 and frame piece 100 thereon). In FIG. 6, o-rings 74, 90 are shown in place.

Referring to FIG. 6, one can understand that support 120, comprising end piece 70, end piece 71 and central support 121, can comprise a single, molded, integral piece. This will be typical, although alternatives are possible.

Referring to FIG. 6, it can be seen that end cap 70 includes a central aperture 75 therein; and, second end cap 71 includes a central aperture 71y therethrough. Further projections 69, surrounded by support 72, can be seen projecting from end piece 71 in a direction away from media pack 25. During installation, FIG. 3, these projections can engage upright projections 69x and bowl 3.

Still referring to FIG. 6, cartridge 5 includes a check valve assembly 130. The check valve assembly 130 includes a check valve member 131, second valve seat 132, valve cage 133 and end member 134. End member 134 includes first valve seat 135 thereon.

During normal operation, the valve member 131 is seated against second valve seat 132 as shown. It can also be understood from further description below, that when valve member 131 is seated against second valve seat 132, no seal or closure at region 132a is formed. Thus, liquid within interior region 26 can drain downwardly through aperture 71y into region 80, FIG. 3. In an instance of vehicle rollover, however, the valve member 131 will roll through cage 133 to seat against second seat 135. When valve member 131 is seated against seat 135, seat 135 is closed to liquid flow. This will inhibit undesirable liquid drainage into an engine crankcase.

It is not required that a complete seal at seat 135 be formed to obtain some benefit. The end member 134 is snap fit in place, to keep valve member 131 in position. The valve member will typically comprise a hollow spherical (ball) member, as shown, although alternatives are possible.

Still referring to FIG. 6, it can be understood that valve cage 133 generally comprises support region or tube 121 of support member 120. Further, the first valve seat 132 comprises a portion of aperture 71y in end piece 71. Region 121 provides a track, for movement, of check valve 131 between valve seats at opposite ends 121x, 121y of support region or tube 121.

Figure 8:
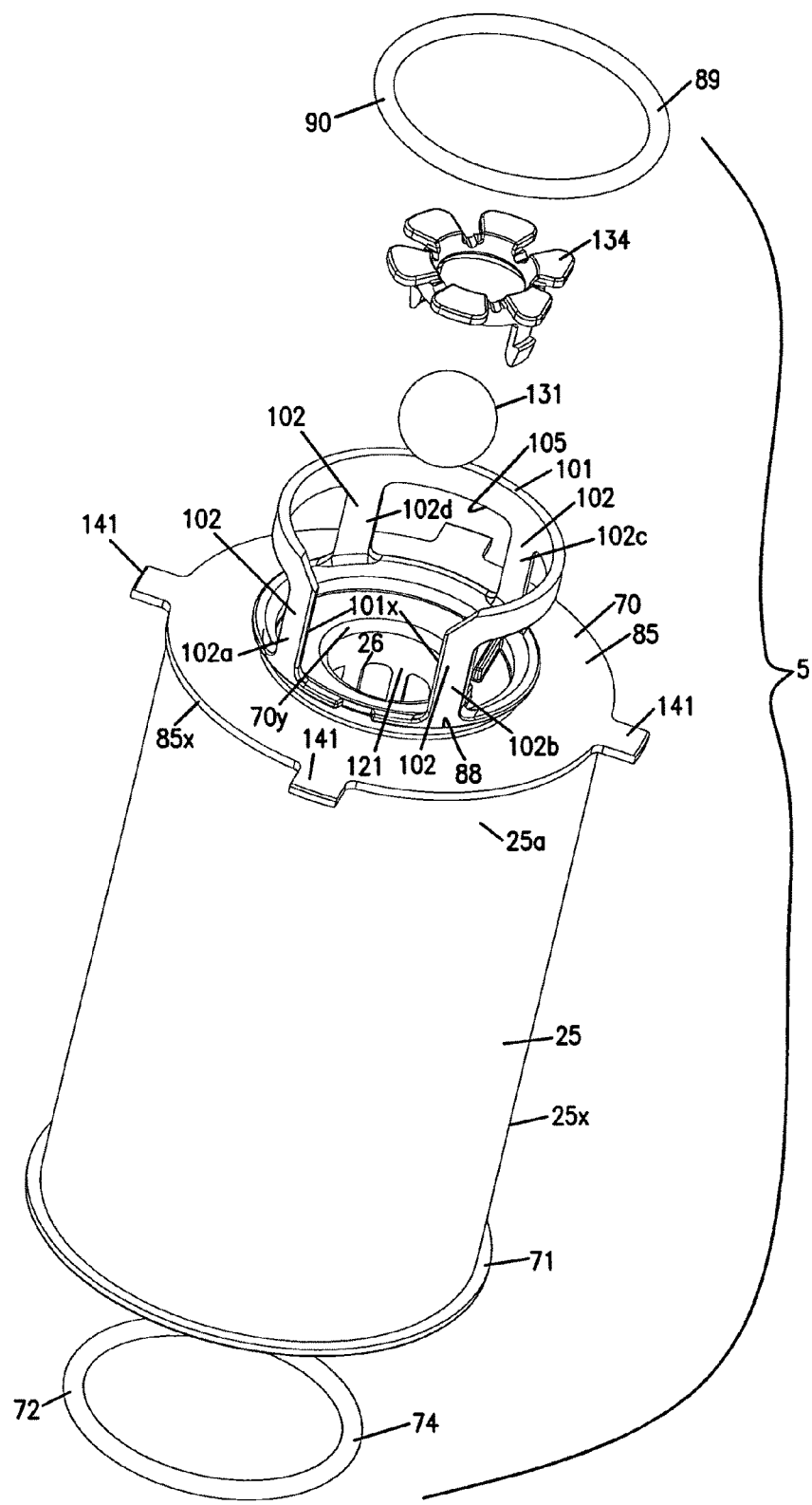
FIG. 8 is a schematic exploded perspective view of the cartridge component depicted in FIGS. 5-7.

Attention is now directed to FIG. 8, an exploded, perspective view of the cartridge 5, FIGS. 5 and 6. Referring to FIG. 8, seal members 89, 72 are viewable. Also viewable is end piece 134 and valve member 131. The media pack 25 is viewable around support member 120.

Still referring to FIG. 8, it can be seen that end piece 70 comprises ring section 85, with outer periphery 85x. Ring section 85 overlaps end 25a of media pack 25. Further, end piece 70 includes spaced, radially outwardly directed projections 141. The projections 141, in FIG. 3, are engaged by downwardly projecting flange shoulder 96 in cover assembly 4, during assembly. This helps secure the cartridge 25 in position. Spacing between the projections 141, allows for gas and liquid flow from region 20 in to annulus 22, FIG. 3.

Still referring to FIG. 3, it is noted that projections 141 also ensure that the cartridge 5 cannot be inserted upside down, within bowl 3. That is, the cartridge 5 can only be inserted in one orientation, since the projections 141 would otherwise interfere with shoulder 149.

Referring again to FIG. 8, it can be seen that upper rail 101 is not completely circular, but rather has a c-shape with a single gap 101x between supports 102a, 102b. Gap 101x is sized and shaped for inner portion 31, FIG. 3, of outlet tube 12 to be received therein and to project therethrough, during assembly. Typically, region 101x is an opening or gap in rail 101 which extends over a radial extension (arc) of at least 20°, typically at least 30°, usually an amount within the range of, 30° to 60° inclusive, often not more than 60°.

Still referring to FIG. 8, it can be seen for the particular projection 86 depicted, rail 101 is supported by four supports 102a-d. An alternate number of supports 102 is possible. It can be also seen by referring to FIG. 8, that rail 101 will operate as a convenient handle member for managing cartridge 5.

Figure 9:
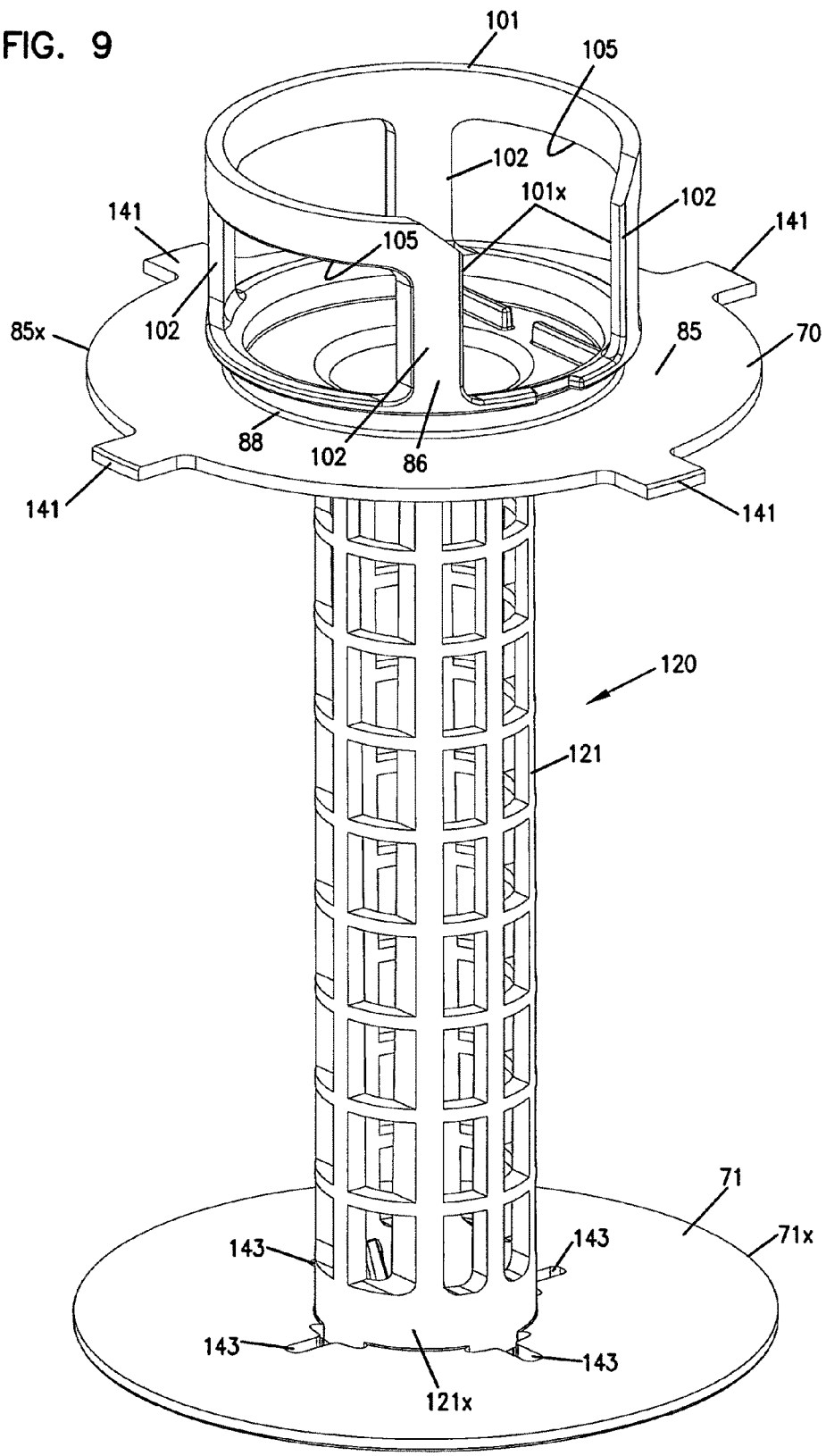
FIG. 9 is a perspective view of a core component usable in the cartridge component of FIGS. 5-8.

Attention is now directed to FIGS. 9-14, in which support member 120 is viewable, in a variety of views, separated from media pack 25. Referring to FIG. 9, a top perspective view is depicted showing end pieces 70, 71. End piece 70 is viewable with ring region 85 having outward projections 141 thereon. Further, axial projection 86, with base 88 is viewable, as well upper rail 101 supported by supports 102. Further, gap 101x is viewable, as well as flow windows 105.

Also referring to FIG. 9, in end piece 71, drain aperture arrangement comprising individual, spaced, apertures 143 can be seen extending through the end piece 71. The drain aperture arrangement 143 will be overlapped by an end of media 25, in cartridge 5, FIG. 5. The drain aperture arrangement 143 allows for liquid drainage directly downwardly from the media pack, through the end piece 71, in operation. It is noted that the drain aperture arrangement 143 is positioned with a portion adjacent to central support 121, in particular adjacent impermeable end section 121x of support 121.

Still referring to FIG. 9, drain apertures of drain aperture arrangement 143 are generally positioned such that each is completely contained within a region of end cap 71 and each is positioned across end cap 71 from outer circumference 71x toward tube 121 such that apertures 143 are at least 20%, usually at least 30%, and often more than 40% (typically more than 50%) across end piece 71 from periphery 71x to aperture 71y; i.e. at least 20% usually at least 30% often, and at least 40% (typically more than 50%) from outer edge 25x to inner edge 25i.

Figure 10:
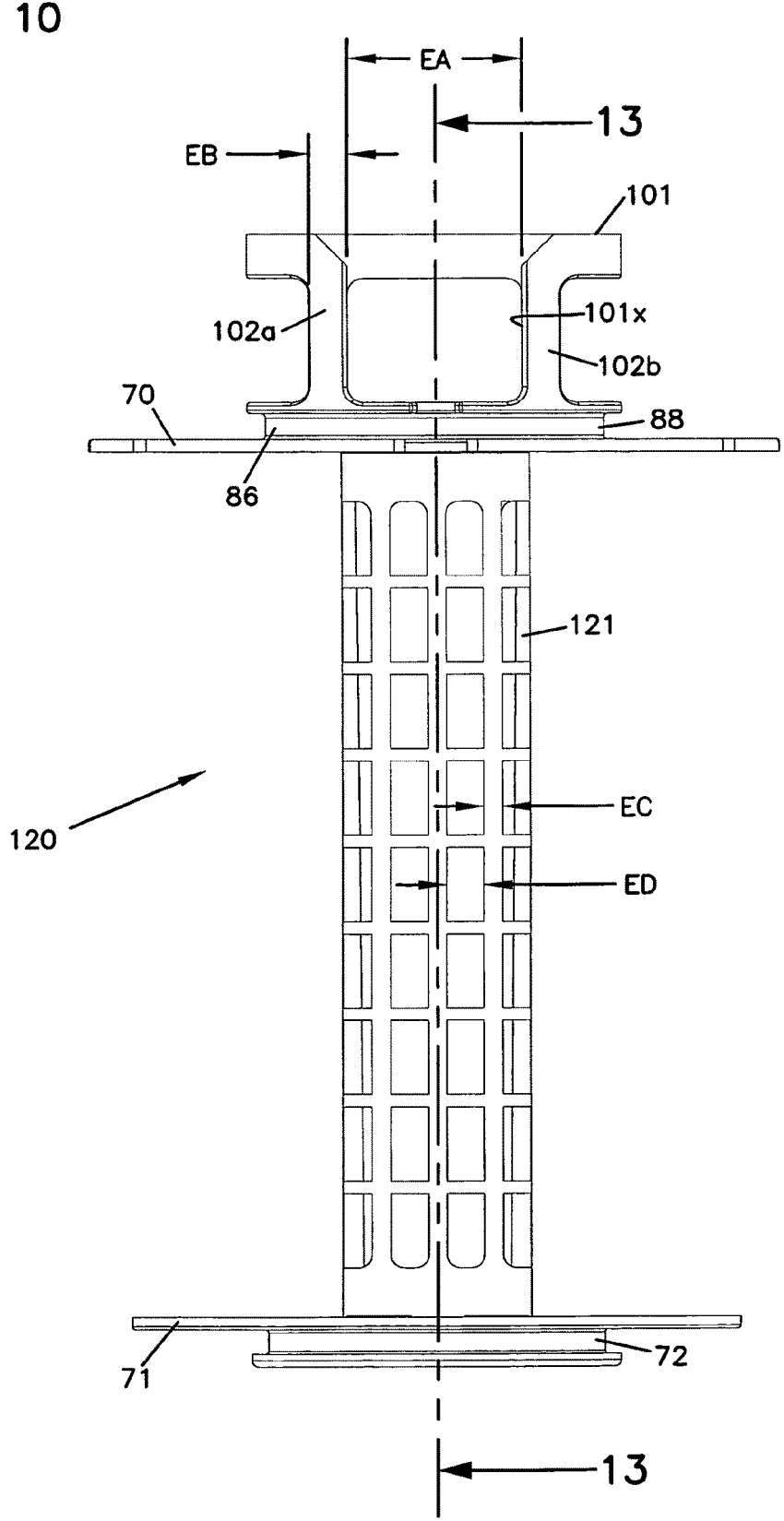
FIG. 10 is schematic, first, side elevational view of the core component depicted in FIG. 9.
Figure 11:
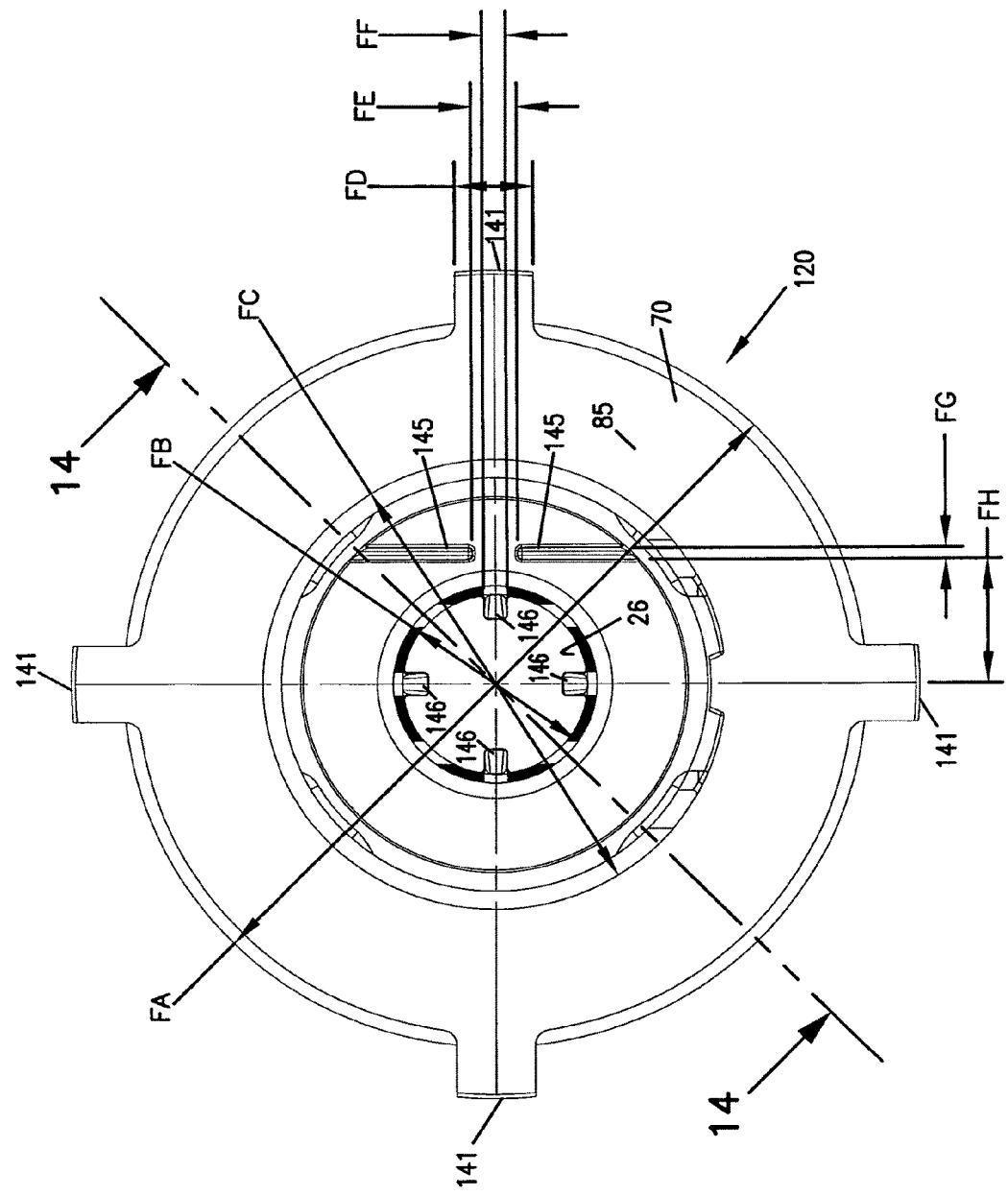
FIG. 11 is a schematic top plan view of the core component depicted in FIG. 10.

In FIG. 10, a side elevational view of support 120 taken directed toward to gap 101x is viewable. In FIG. 11, a top, plan view of support 120 is depicted. Here projections 145 are viewable. Projections 145 provide for orientation of a snap fit piece, discussed below in connection with FIGS. 15-18.

Referring to FIG. 11, attention is directed to spaced projections 143, within interior 26. Spaced projections 146 are positioned adjacent opposite end piece 71, see FIG. 3. Spaced projections 146 ensure that when valve member 131 is positioned on end piece 71, flow spaces around the valve member 131 are provided.

Figure 12:
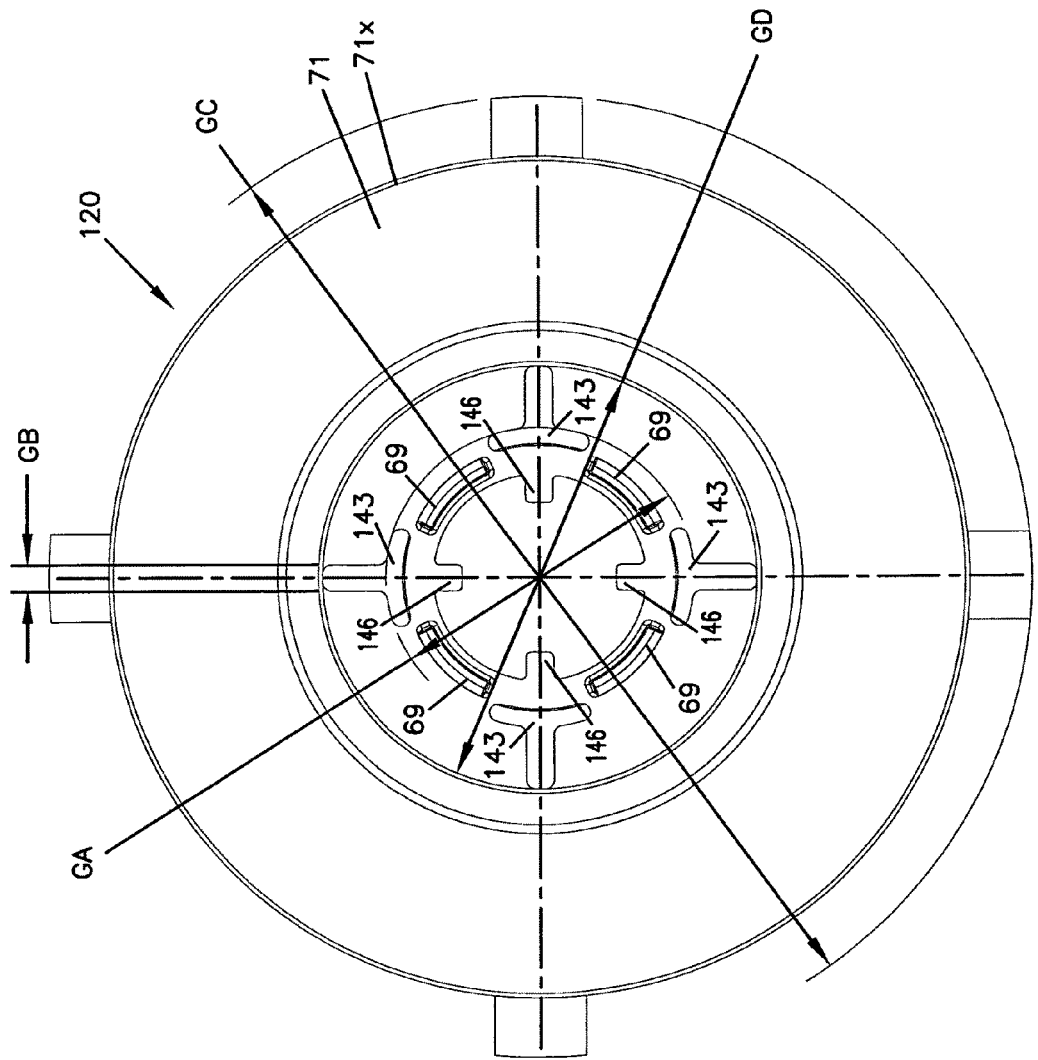
FIG. 12 is schematic bottom view of the core component depicted in FIG. 10.
Figure 13:
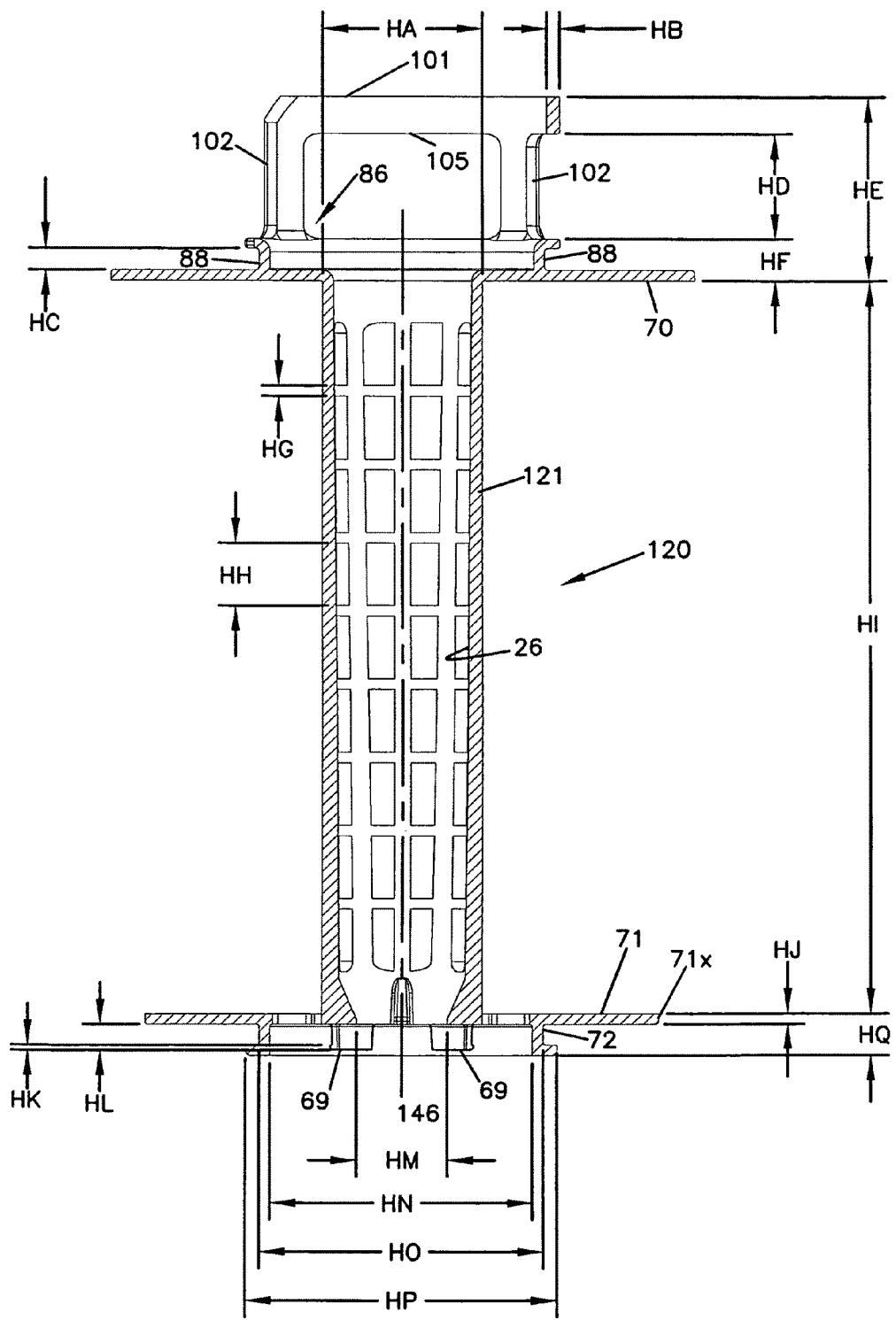
FIG. 13 is a schematic, cross-sectional, view of the component depicted in FIG. 10.

In FIG. 12, a bottom plan view of member 120 is viewable. Here projections 146 are also viewable. In FIG. 13, a cross-sectional view taken along line 13-13, FIG. 10 is viewable, and projections 146 are further defined.

Figure 14:
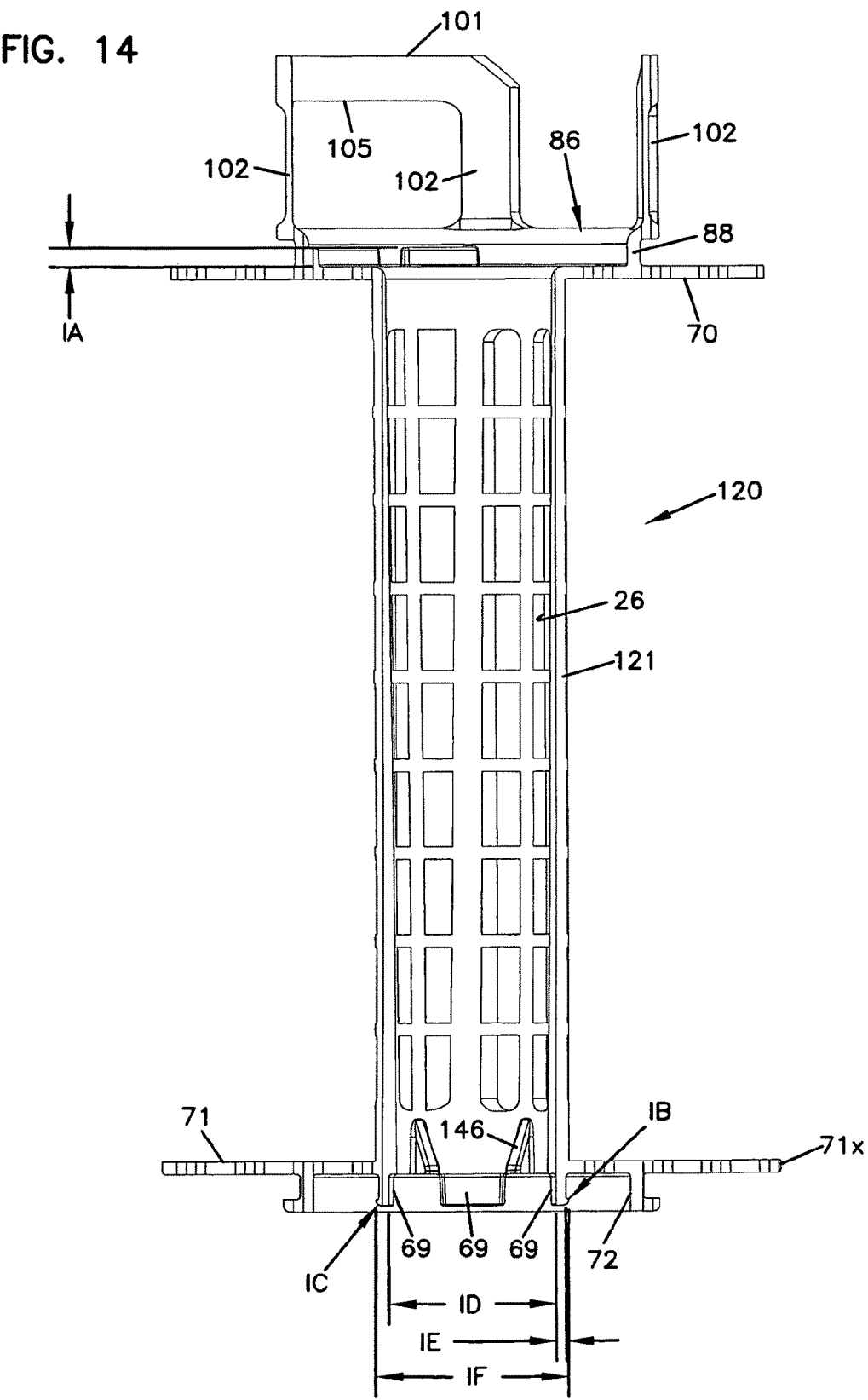
FIG. 14 is a second, schematic, cross-sectional of the component depicted in FIG. 10.

In FIG. 14, a cross-sectional view along line 14-14, FIG. 12 is provided, allowing further inspection of the described features.

Figure 15:
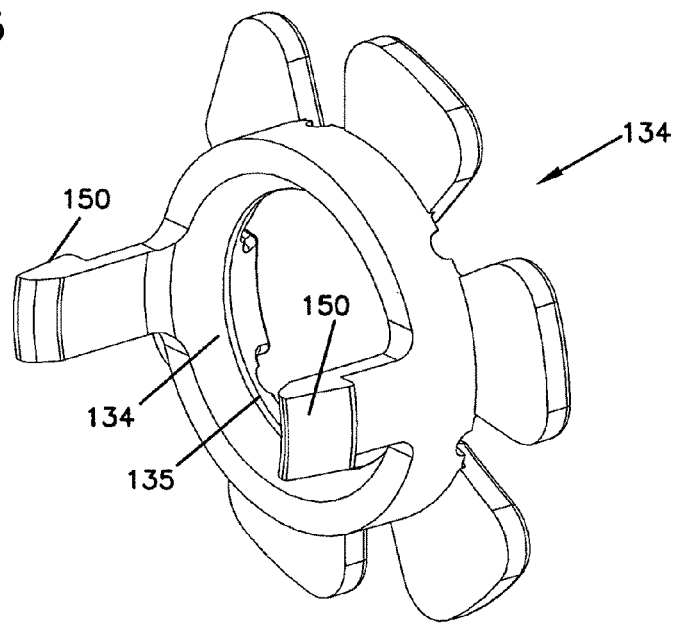
FIG. 15 is perspective view of a check valve end member of the cartridge depicted in FIGS. 5-8.
Figure 16:
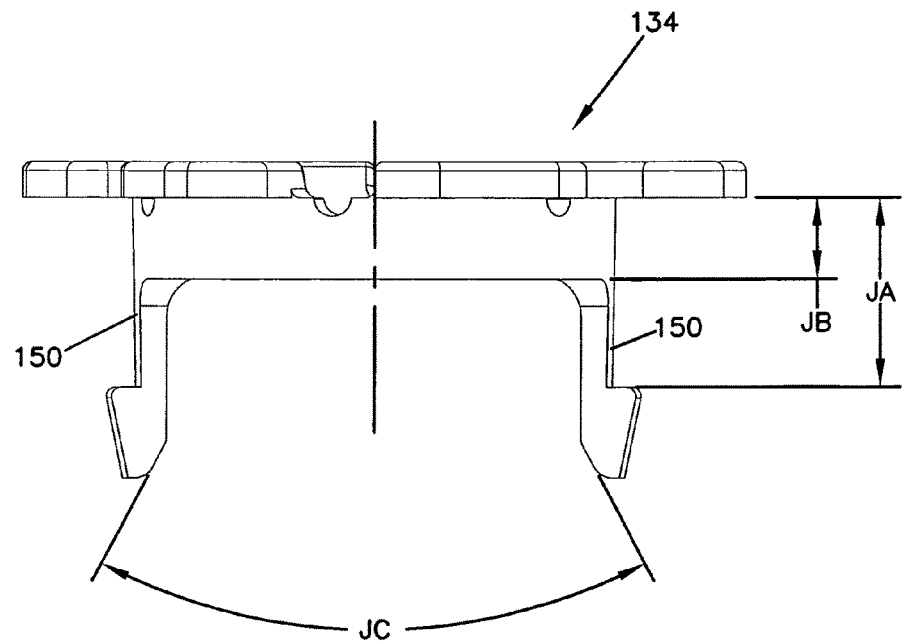
FIG. 16 is a side elevational view of the end member of FIG. 15.
Figure 17:
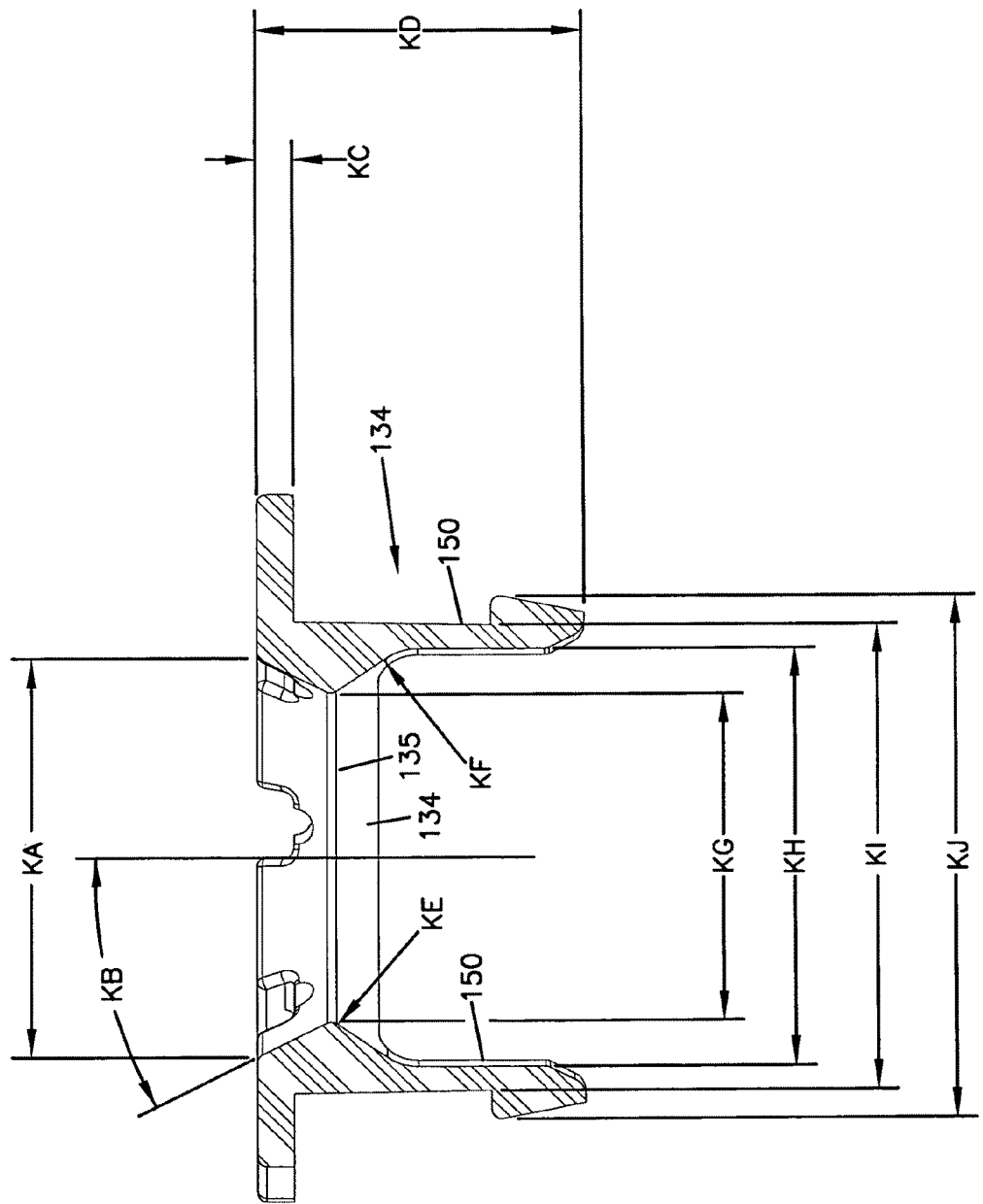
FIG. 17 is a schematic, cross-sectional view of the side piece component depicted in FIG. 16; the view of FIG. 17 being taken along line 17-17 FIG. 18.
Figure 18:
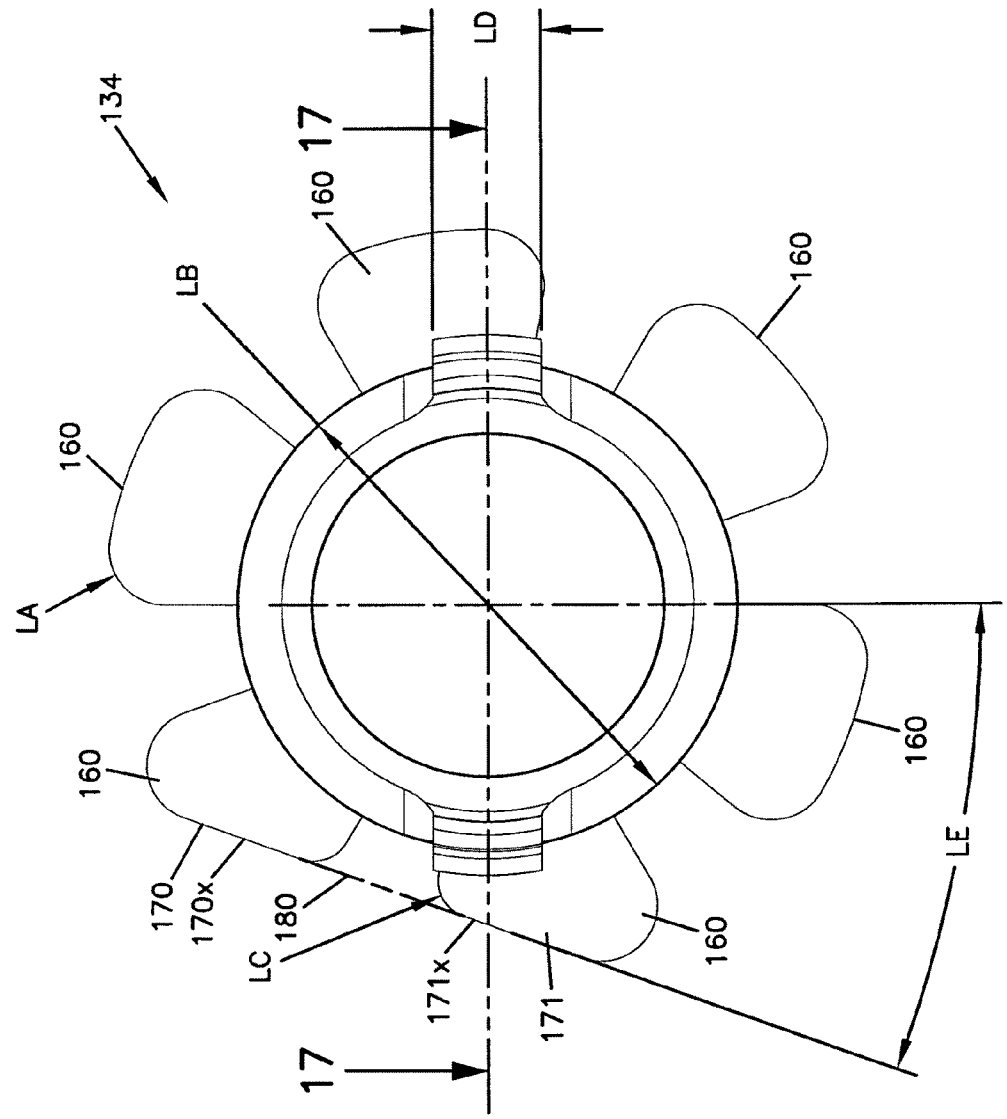
FIG. 18 is schematic top plan view of the component depicted in FIG. 16.

Attention is now directed to FIGS. 15-18 in which various views of end member 134 are provided. In FIG. 15, a perspective view is shown of end piece 134. Snap fit projections 150 are viewable. These will engage support 120, when end piece 134 is positioned in place. In FIG. 16, a side elevational view is shown. In FIG. 17 a cross-sectional is viewable. In FIG. 18, a top plan view of end piece 134 is viewable. It is noted that end piece 134 has a petal arrangement comprising a plurality of radially outwardly projecting, radially spaced, projections 160. The projections include two projections 170, 171, distorted in shape to accommodate engagement along projections along 145, FIG. 11.

Referring still to FIG. 18, and more specifically, two projections 170, 171 are truncated along edges 170x, 171x, along line 180. This is needed, for engagement against projections 145 in the support member 120. As a result, snap fit member 134 can only be oriented relative to support member 120, in one radial orientation for snap fit. This ensures the snap projections 150 will be aligned with receiver portions of support 120 to which they can engage, during installation.

A variety of materials can be utilized for the components of assembly 1. Typically molded components will comprise glass filled polyamide, although alternatives are possible. According to FIG. 3, it is noted that gasket 68 is received within a receiver 68x. The receiver 68x can be provided with a gap therein, to facilitate replacement of gasket 68.

It is noted that under a vehicle rollover condition, in which the valve member 131 seats against seat 135, pressure within the assembly 1 will, increase, and pressure relieve assembly 40 will open.

C. Dimensions of an Example System

In FIGS. 1-18, dimension and angle lines are provide for an example system. Dimensions for the example system indicated are as follows: In FIG. 1, AA=180 mm; In FIG. 2

Figure 7:
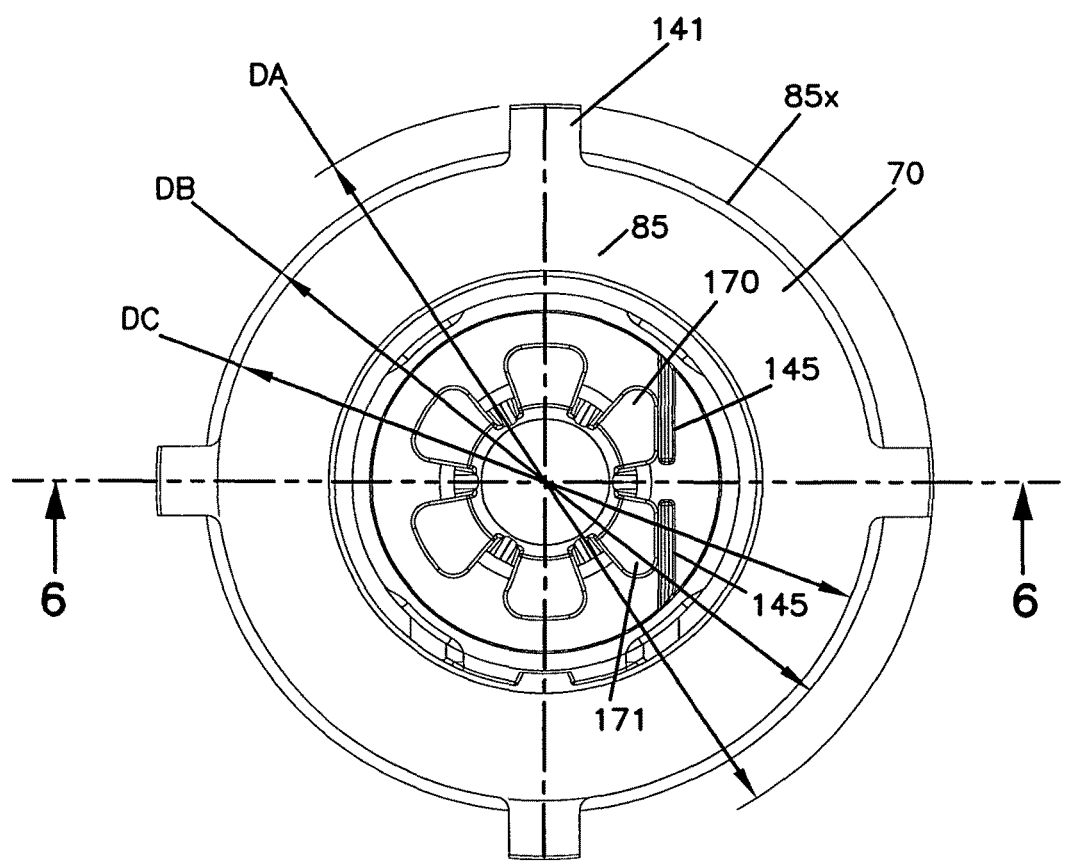
FIG. 7 is top plan view of the cartridge component depicted in FIGS. 5 and 6.

BA=120 mm; In FIG. 6 DA=183 mm; CB=140 mm; In FIG. 7, DA=109 mm diameter; DB=95.5 mm diameter; and, DC=92 mm diameter; In FIG. 10, EA=28 mm; EB=6 mm; EC=3 mm; and, ED=6 mm; In FIG. 11 FA=95.5 mm diameter; FB=26 mm diameter; FC=59.3 mm diameter; FD=10 mm; FE=5.8 mm; FF=3 mm; FG=1.5 mm; and, FH=16.5 mm; In FIG. 12 GA=34 mm diameter; GB=3 mm; GC=109 mm diameter; GD=48 mm diameter; In FIG. 13 HA=30 mm; HB=2.4 mm; HC=4.2 mm; HD=20 mm; HE=35 mm; HF=8 mm; HG=2 mm; HH=12 mm; HI=140 mm; HJ=2 mm; HK=1 mm; HL=5 mm; HM=17 mm; HN=49 mm; HO=53 mm; HP=58.1 mm; and, HQ=8 mm; In FIG. 14, IA=3 mm; IB=0.2 mm radius; IC=1 mm radius; ID=26 mm; TE=1.5 mm; and, IF=29.9 mm; In FIG. 16, JA=10.5 mm; JB=4.5 mm; and, JC=54°; In FIG. 17, KA=22 mm; KB=26.6°; KC=2 mm; KD=17.5 mm; KE=0.5 mm radius; KF=3 mm radius; KG=18 mm; KH=23 mm; KI=25.6 mm; and, KJ=28.8; and, In FIG. 18, LA=3 mm radius; LB=26 mm diameter; LC=2 mm radius; LD=5.6 mm; and, LE=20°.

D. An Example System, FIG. 19

Figure 19:
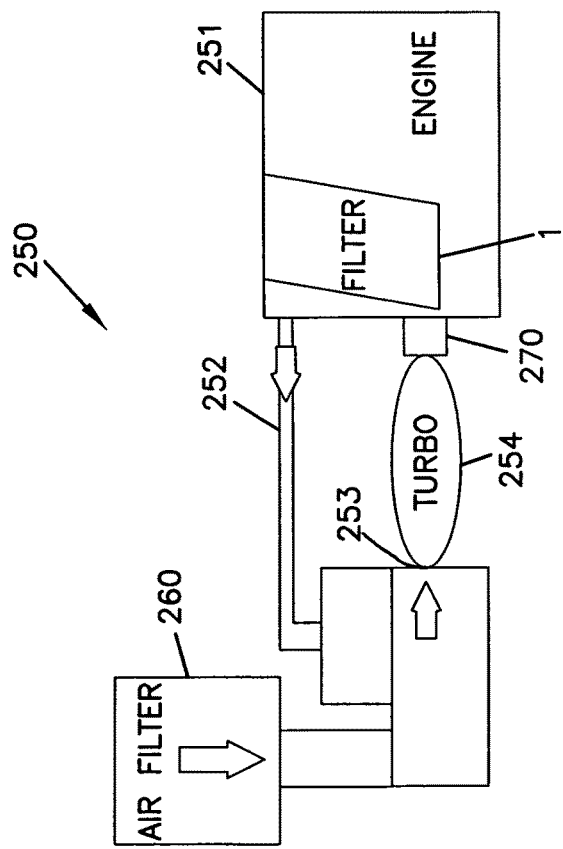
FIG. 19 is a schematic view of an equipment system including a filter assembly according to the present disclosure therein.

Attention is directed to FIG. 19, which shows an example system and including a filter assembly 1 according to the present. Referring to FIG. 19, the system 250 includes an engine 251. The filter assembly 1 is depicted, schematically, orientated to receive crankcase ventilation flow from the engine 251. At 252 off gases from the filter assembly are shown directed ultimately to inlet 253 of turbo 254. In FIG. 19, air clearer arrangement 260 is shown, which provides for filtered and ambient air flow to the turbo 254 and the engine 251.

Of course, the off gases 252 can be directed elsewhere, for example into air cleaner 260, if desired.

In general, the system 250 depicted is "closed" in that filtered off gases from the filter arrangement 1 are not vented directed to the atmosphere, but rather are cycled back into the engine intake, indicated generally at 270.

II. Usable Media

A. General Characteristics

The appropriate media, for the media pack, is selected for the conditions of use. Generally the media is selected to have appropriate properties with respect to: coalescing and drainage of liquid; and, filtering of gases passing therethrough with respect to particulates. Layers of media can be utilized for the media of the media pack. Example usable media is described in U.S. Provisional Application Ser. No. 60/731,287, filed Oct. 28, 2005, PCT Application PCT/US2006/041738, filed Oct. 27, 2006, U.S. Provisional Application 60/656,806, filed Feb. 22, 2006; and, PCT Publication WO06/91594, published Aug. 31, 2006, and PCT Publication WO 2006/084282, published Oct. 19, 2006, each of which is incorporated herein by reference.

Typically the media will comprise a continuous, non-woven, fibrous media.

An example useable media as described in U.S. provisional application 60/656,806 filed Feb. 22, 2005, incorporated herein by reference. Another example media is described in PCT Publication WO 05/083,240, published Sep. 9, 2005, and incorporated herein by reference. A third example media is described in U.S. provisional application 60/650,051 filed Feb. 4, 2005, incorporated herein by reference. The following description is of example media from U.S. provisional application 60/650,051, filed Feb. 4, 2005.

The media is typically a wet laid media is formed in a sheet form using wet laid processing, and is then positioned on/in the filter cartridge. Typically the wet laid media sheet is at least used as a media stage stacked in multiple layers.

As indicated, multiple layers, forming a gradient can be provided in a media stage, by first applying one or marc layers of wet laid media of first type and then applying one or marc layers of a media (typically a wet laid media) of a different, second, type. Typically when a gradient is provided, the gradient involves use of two or marc media types which are selected for at least differences in efficiency.

Herein, it is important to distinguish between the definition of the media sheet used to form the media stage, and the definitions of the overall media stage itself. Herein the term "wet laid sheet," "media sheet" or variants thereof, is used to refer to the sheet material that is used to form the media extension of a filter, as opposed to the overall definition of the total media extension in the filter. This will be apparent from certain of the following descriptions.

Media extensions of the type of primary concern herein, are at least used for coalescing/drainage, although they typically also have particulate removal function and thus comprise a portion of an overall media stage that provides for both coalescing/drainage and desired removal efficiency of solid particulate removal.

Although alternatives are possible, an example media composition used to form a media extension in a CCV (crankcase ventilation) filter for coalescing/drainage is typically as follows:

1. Although alternatives are possible for different applications, it is typically provided in a form having a calculated pore size (X-Y direction) of at least 10 micron, usually at least 12 micron. The pore size is typically no greater than 60 micron, for example within the range of 12-50 micron, typically 15-45 micron.
2. It is typically formulated to have a DOPE % efficiency (at 10.5 fpm for 0.3 micron particles), within the range of 3-18%, typically 5-15%.
3. It typically comprises at least 30% by weight, typically at least 40% by weight, often at least 45% by weight and usually within the range of 45-70% by weight, based on total weight of filter material within the sheet, bi-component (binder) fiber material in accord with the general description provided herein.
4. It typically comprises 30 to 70% (typically 30-55%), by weight, based on total weight of fiber material within the sheet, of secondary fiber material having average largest cross-sectional dimensions (average diameter if round) of at least 1 micron, for example within the range of 1 to 20 micron. In some instances it will be 8-15 micron. The average lengths are typically 1 to 20 mm, often 1-10 mm. This secondary fiber material can be a mix of fibers. Typically polyester and/or glass fibers are used, although alternatives are possible.
5. Typically and preferably the fiber sheet (and resulting media extension) includes no added binder other than the binder material contained within the bi-component fibers. If an added resin or binder is present, preferably it is present at no marc than about 7% by weight of the total fiber weight, and marc preferably no marc than 3% by weight of the total fiber weight.

Media in accord with the general definitions provided herein, including a mix of bi-component (binder) fiber and other fiber, can be used as any (and in some instances all) layer(s) of a media stage in a crankcase ventilation filter as generally described above. When used in this manner, it will typically be placed in multiple layers, although alternatives are possible. The overall efficiency can be calculated based upon the number of layers and the efficiency of each layer. For example the efficiency at 10.5 feet per minute (3.2 m/min) for 0.3 micron DOPE particles for media stage comprising two layers of wet laid media each having an efficiency of 12% would be 22.6%, i.e., 12%+0.12×88.

Typically enough media sheets would be used in the final media stage to provide the media stage with overall efficiency of at least 85%, typically 90% or greater. In some instances it would be preferred to have the efficiency at 95% or marc. In the context the term "final media stage" refers to a stage resulting from wraps or coils of the sheet(s) of the media.

B. The Preferred Calculated Pore Size

The media extension performs two important functions:
1. It provides for some coalescing and drainage of oil particles carried in the crankcase ventilation gases being filtered; and
2. It provides for selected filtration of other particulates in the gas stream.
  In general, if the pore size is too low:
  a. Drainage of coalesced oil particles by gravity, downwardly through (and from) the media, can be difficult or slowed, which leads to an increase of re-entrainment of the oil into the gas stream; and
  b. Unacceptable levels of restriction are provided to the crankcase gas flow through the media.
  In general, if the porosity is too high:
  a. Oil particles are less likely to collect and coalesce; and
  b. A large number of layers, and thus media thickness, will be necessary to achieve an acceptable overall level of efficiency for the media pack.

It has been found that for crankcase ventilation filters, a calculated pore size for media used to form media extension within the range of 12 to 50 micron is generally useful. Typically the pore size is within the range of 15 to 45 micron.

The term X-Y pore size and variants thereof when used herein, is meant to refer to the theoretical distance between fibers in a filtration media. X-Y refers to the surface direction versus the Z direction which is the media thickness.

The calculation assumes that all the fibers in the media are lined parallel to the surface of the media, equally spaced, and ordered as a square when viewed in cross-section perpendicular to the length of the fibers. The X-Y pore size is a distance between the fiber surfaces on the opposite corners of the square. If the media is composed of fibers of various diameters, the $d^2$ mean of the fiber is used as the diameter. The $d^2$ mean is the square root of the average of the diameters squared.

It has been found, in some instances, that it is useful to have calculated pore sizes on the higher end of the preferred range, typically 30 to 50 micron, when the media stage at issue has a total vertical height, in the crankcase ventilation filter of less than 7 inches (178 mm); and, pore sizes on the smaller end, about 15 to 30 micron, are sometimes useful when the filter cartridge has a height on the larger end, typically 7-12 inches (178-305 mm). A reason for this is that taller filter stages provide for a higher liquid head, during coalescing, which can force coalesced liquid flow, under gravity, downwardly through smaller pores, during drainage. The smaller pores, of course, allow for higher efficiency and fewer layers.

Of course in a typical operation in which the same media stage is being constructed for use in a variety of filter sizes, typically for at least a portion of the wet laid media used for the coalescing/drainage in initial separation, an average pore size of about 30-50 microns will be useful.

C. Solidity

Solidity is the volume fraction of media occupied by the fibers. It is the ratio of the fibers volume per unit mass divided by the media's volume per unit mass.

Typical materials preferred for use in media extension according to the present disclosure, have a percent solidity at 0.125 psi (8.6 milliards) of fewer than 10%, and typically fewer than 8%, for example 6-7%.

D. Preferred DOPE Efficiency at 10.5 ft/Minute for 0.3 Micron Particles

The preferred efficiency stated, is desirable for layers or sheets of media to be used to generate crankcase ventilation filters. This requirement indicates that a number of layers of the wet laid media will typically be required, in order to generate an overall desirable efficiency for the media stage of typically at least 85% or often 90% or greater, in some instances 95% or greater.

The reason a relatively low efficiency is provided in any given layer, is that it facilitates coalescing and drainage and overall function.

In general, DOPE efficiency is a fractional efficiency of a 0.3 micron DOPE particle (dactyl phthalate) challenging the media at 10 fpm. A TSAR model 3160 Bench (TSAR Incorporated, St. Paul, Minn.) can be used to evaluate this property. Model dispersed particles of DOPE are sized and neutralized prior to challenging the media.

III. The Media Composition

A. The Bi-Component Fiber Constituent

As indicated above, it is preferred that the fiber composition of the media include 30 to 70%, by weight, of bi-component (binder) fiber material. A major advantage of using bi-component fibers in the media, is effective utilization of fiber size while maintaining a relatively low solidity. With the bi-component fibers, this can be achieved while still accomplishing a sufficiently high strength media for handling installation in crankcase ventilation filters. Also, the bi-component fibers are binder fibers.

The bi-component fibers generally comprise two polymeric components formed together, as the fiber. Various combinations of polymers for the bi-component fiber may be useful, but it is important that the first polymer component melt at a temperature lower than the melting temperature of the second polymer component and typically below 205° C. Further, the bi-component fibers are integrally mixed and evenly dispersed with the other fibers, in forming the wet laid media. Melting of the first polymer component of the bi-component fiber is necessary to allow the bi-component fibers to form a tacky skeletal structure, which upon cooling, captures and binds many of the other fibers, as well as other bi-component fibers.

Although alternatives are possible, typically the bi-component fibers will be formed in a sheath core form, with a sheath comprising the lower melting point polymer and the core forming the higher melting point.

In the sheath-core structure, the low melting point (e.g., about 80 to 205° C.) thermoplastic is typically extruded around a fiber of the higher melting point material (e.g., about 120 to 260° C.). In use, the bi-component fibers typically have a average largest cross-sectional dimension (average fiber diameter if round) of about 5 to 50 micrometer often about 10 to 20 micrometer and typically in a fiber form generally have an average length of at least 1 mm, and not greater than 30 mm, usually no marc than 20 mm, typically 1-10 mm. By "largest" in this context, reference is meant to the thickest cross-section dimension of the fibers.

Such fibers can be made from a variety of thermoplastic materials including polyolefin's (such as polyethylene's, polypropylenes), polyesters (such as polyethylene terephthalate, polybutylene terephthalate, PCT), nylons including nylon 6, nylon 6, 6, nylon 6, 12, etc. Any thermoplastic that can have an appropriate melting point can be used in the low melting component of the bi-component fiber while higher melting polymers can be used in the higher melting "core" portion of the fiber. The cross-sectional structure of such fibers can be a "side-by-side" or "sheath-core" structure or other structures that provide the same thermal bonding function. One could also use lobed fibers where the tips have lower melting point polymer. The value of the bi-component fiber is that the relatively low molecular weight resin can melt under sheet, media, or filter forming conditions to act to bind the bi-component fiber, and other fibers present in the sheet, media, or filter making material into a mechanically stable sheet, media, or filter.

Typically, the polymers of the bi-component (core/shell or sheath and side-by-side) fibers are made up of different thermoplastic materials, such as for example, polyolefin/polyester (sheath/core) bi-component fibers whereby the polyolefin, e.g. polyethylene sheath, melts at a temperature lower than the core, e.g. polyester. Typical thermoplastic polymers include polyolefins, e.g. polyethylene, polypropylene, polybutylene, and copolymers thereof, polytetrafluoroethylene, polyesters, e.g. polyethylene terephthalate, polyvinyl acetate, polyvinyl chloride acetate, polyvinyl butyral, acrylic resins, e.g. polyacrylate, and polymethylacrylate, polymethylmethacrylate, polyamides, namely nylon, polyvinyl chloride, polyvinylidene chloride, polystyrene, polyvinyl alcohol, polyurethanes, cellulosic resins, namely cellulosic nitrate, cellulosic acetate, cellulosic acetate butyrate, ethyl cellulose, etc., copolymers of any of the above materials, e.g. ethylene-vinyl acetate copolymers, ethylene-acrylic acid copolymers, styrene-butadiene block copolymers, Kraton rubbers and the like. Particularly preferred in the present invention is a bi-component fiber known as 271P available from DuPont. Others fibers include FIT 201, Kuraray N720 and the Nichimen 4080 and similar materials. All of these demonstrate the characteristics of cross-linking the sheath polymer upon completion of first melt. This is important for liquid applications where the application temperature is typically above the sheath melt temperature. If the sheath does not fully crystallize then the sheath polymer will remelt in application and coat or damage downstream equipment and components.

An example of a useable bi-component (binder) fiber for forming wet laid media sheets for use in CCV media is DuPont polyester bi-component 271P, typically cut to a length of about 6 mm.

B. The Secondary Fiber Materials

The bi-component fibers provide a matrix for the crankcase ventilation filter media. The additional fibers or secondary fibers, sufficiently fill the matrix to provide the desirable properties for coalescing and efficiency.

The secondary fibers can be polymeric fibers, glass fibers, metal fibers, ceramic fibers or a mixture of any of these. Typically glass fibers, polymeric fibers or a mixture are used.

Glass fibers useable in filter media of the present invention include glass types known by the designations: A, C, D, E, Zero Boron E, ECR, AR, R, S, S-2, N, and the like, and generally, any glass that can be made into fibers either by drawing processes used for making reinforcement fibers or spinning processes used for making thermal insulation fibers.

Non-woven media of the invention can contain secondary fibers made from a number of both hydrophilic, hydrophobic, oleophilic, and oleophobic fibers. These fibers cooperate with the glass fiber and the bi-component fiber to form a mechanically stable, but strong, permeable filtration media that can withstand the mechanical stress of the passage of fluid materials and can maintain the loading of particulate during use. Secondary fibers are typically monocomponent fibers with average largest cross-sectional dimension (diameters if round) that can range from about 0.1 on up, typically 1 micron or greater, often 8-15 microns and can be made from a variety of materials including naturally occurring cotton, linen, wool, various cellulosic and proteinaceous natural fibers, synthetic fibers including rayon, acrylic, aramide, nylon, polyolefin, polyester fibers. One type of secondary fiber is a binder fiber that cooperates with other components to bind the materials into a sheet. Another type of secondary fiber is a structural fiber that cooperates with other components to increase the tensile and burst strength the materials in dry and wet conditions. Additionally, the binder fiber can include fibers made from such polymers as polyvinyl chloride, polyvinyl alcohol. Secondary fibers can also include inorganic fibers such as carbon/graphite fiber, metal fiber, ceramic fiber and combinations thereof.

The secondary thermoplastic fibers include, but are not limited to, polyester fibers, polyamide fibers, polypropylene fibers, copolyetherester fibers, polyethylene terephthalate fibers, polybutylene terephthalate fibers, polyetherketoneketone (PEKK) fibers, polyetheretherketone (PEEK) fibers, liquid crystalline polymer (LCP) fibers, and mixtures thereof. Polyamide fibers include, but are not limited to, nylon 6, 66, 11, 12, 612, and high temperature "nylons" (such as nylon 46) including cellulosic fibers, polyvinyl acetate, polyvinyl alcohol fibers (including various hydrolysis of polyvinyl alcohol such as 88% hydrolyzed, 95% hydrolyzed, 98% hydrolyzed and 99.5% hydrolyzed polymers), cotton, viscose rayon, thermoplastic such as polyester, polypropylene, polyethylene, etc., polyvinyl acetate, polylactic acid, and other common fiber types.

Mixtures of the fibers can be used, to obtain certain desired efficiencies and other parameters.

The sheet media of the invention are typically made using papermaking processes. Such wet laid processes are particularly useful and many of the fiber components are designed for aqueous dispersion processing. However, the media of the invention can be made by air laid processes that use similar components adapted for air laid processing. The machines used in wet laid sheet making include hand laid sheet equipment, Fourdrinier papermaking machines, cylindrical papermaking machines, inclined papermaking machines, combination papermaking machines and other machines that can take a properly mixed paper, form a layer or layers of the furnish components, remove the fluid aqueous components to form a wet sheet. A fiber slurry containing the materials are typically mixed to form a relatively uniform fiber slurry. The fiber slurry is then subjected to a wet laid papermaking process. Once the slurry is formed into a wet laid sheet, the wet laid sheet can then be dried, cured or otherwise processed to form a dry permeable, but real sheet, media, or filter. For a commercial scale process, the bi-component mats of the invention are generally processed through the use of papermaking-type machines such as commercially available Fourdrinier, wire cylinder, Stevens Former, Roto Former, Inver Former, Venti Former, and inclined Delta Former machines. Preferably, an inclined Delta Former machine is utilized. A bi-component mat of the invention can be prepared by forming pulp and glass fiber slurries and combining the slurries in mixing tanks, for example. The amount of water used in the process may vary depending upon the size of the equipment used. The furnish may be passed into a conventional head box where it is dewatered and deposited onto a moving wire screen where it is dewatered by suction or vacuum to form a non-woven bi-component web.

The binder in the bi-component fibers is activated by passing the matt through a heating step. The resulting material can then be collected in a large roll if desired.

C. Surface Treatments of the Fibers

Modification of the surface characters of the fibers, increase in the contact angle, can enhance drainage capability of filtration media and thus the formed elements of the filter (with respect to pressure drop and mass efficiency). A method of modifying the surface of the fibers is to apply a surface treatment such as a flourochemical or silicone containing material, typically up to 5% by weight of the media.

The surface treatment agent can be applied during manufacture of the fibers, during manufacture of the media or after manufacture of the media post-treatment, or after provision of the media pack. Numerous treatment materials are available such as flourochemicals or silicone containing chemicals that increase contact angle. An example is the DuPont Zonyl™ flourochemicals, such as #7040 or #8195.

IV. An Alternate, Second, Embodiment, FIGS. 20-31

In FIGS. 20-31, features related to a crankcase ventilation filter arrangement, in an alternate form to that previously discussed above, are depicted. In general, then, these figures reflect a second embodiment incorporating principles according to the present disclosure.

Figure 20:
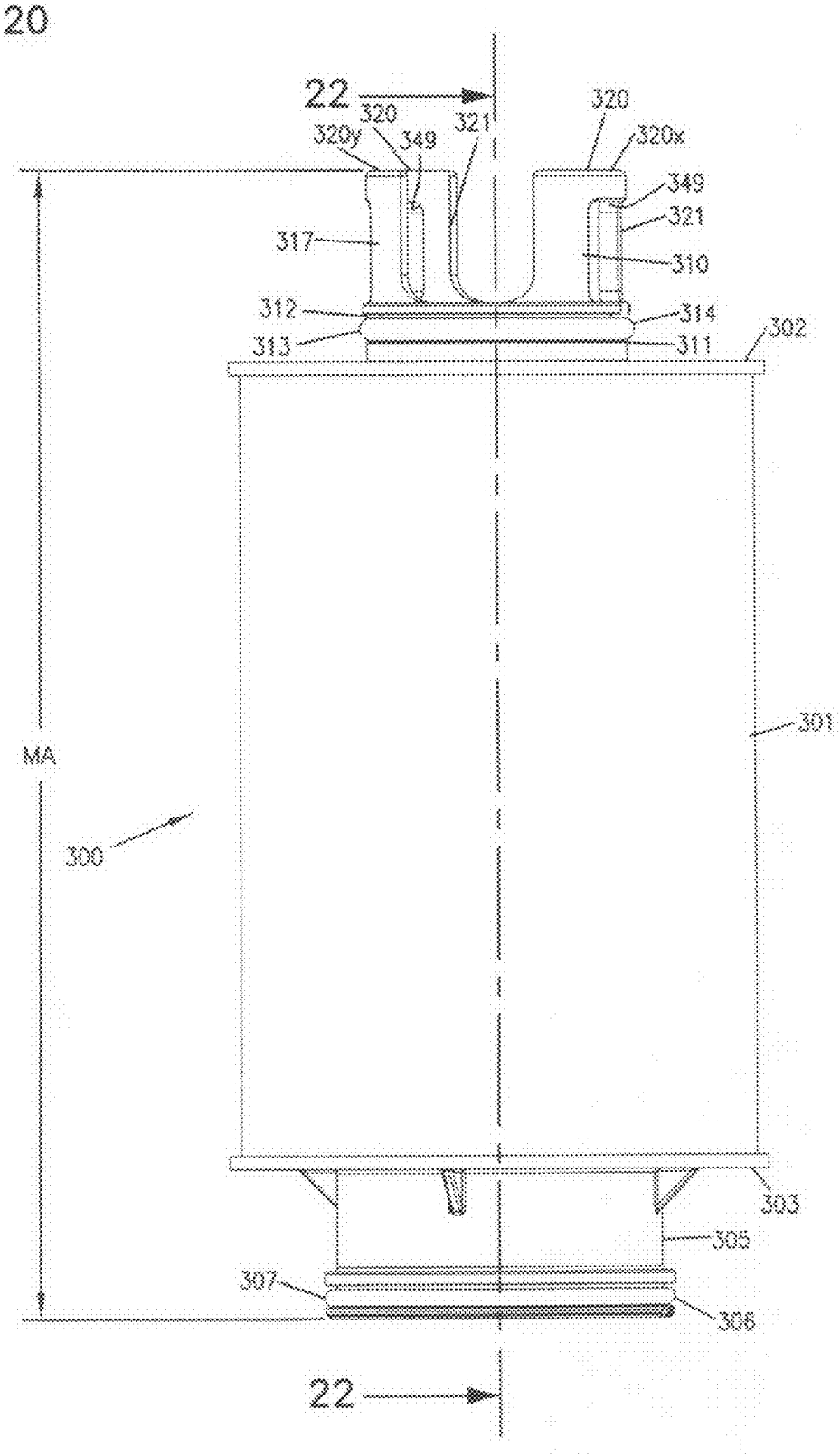
FIG. 20 is a schematic side elevational view of alternate filter cartridge including features according to the present disclosure.

Attention is first directed to FIG. 20, in which a crankcase ventilation filter 300 is depicted in side elevational view. The cartridge 300 comprises a media pack 301 positioned between: a first, upper, end piece 302; and, a second, lower, end piece 303.

An axial projection arrangement 305 is depicted projecting, axially, from end piece 303 in direction away from end piece 302 and media pack 301. The projection arrangement 305 includes a seal arrangement 306 thereon. The seal arrangement 306, for the example cartridge 300 depicted, comprises a radial seal in the form of an o-ring 307 positioned to surround a portion of projection arrangement 305.

Still referring to FIG. 20, axial projection arrangement or support 310 is provided projecting axially from end piece 302 in a direction opposite media pack 301, projection arrangement 305 and end piece 303. The projection arrangement 310 includes a base 311 comprising in part a seal support 312 with a seal arrangement 313, in the example depicted comprising a radial seal in the form of an o-ring 314.

In addition, the projection arrangement 310 includes a framework 317 projecting from the base 311 generally in a direction away from media pack 301 and end piece 303. The framework 317 comprises an upper rail 320 and a support arrangement 321. It is noted that for the particular example cartridge 300 depicted, the upper rail arrangement 320 comprises two spaced arcuate, rail sections 320x, 320y.

Figure 21:
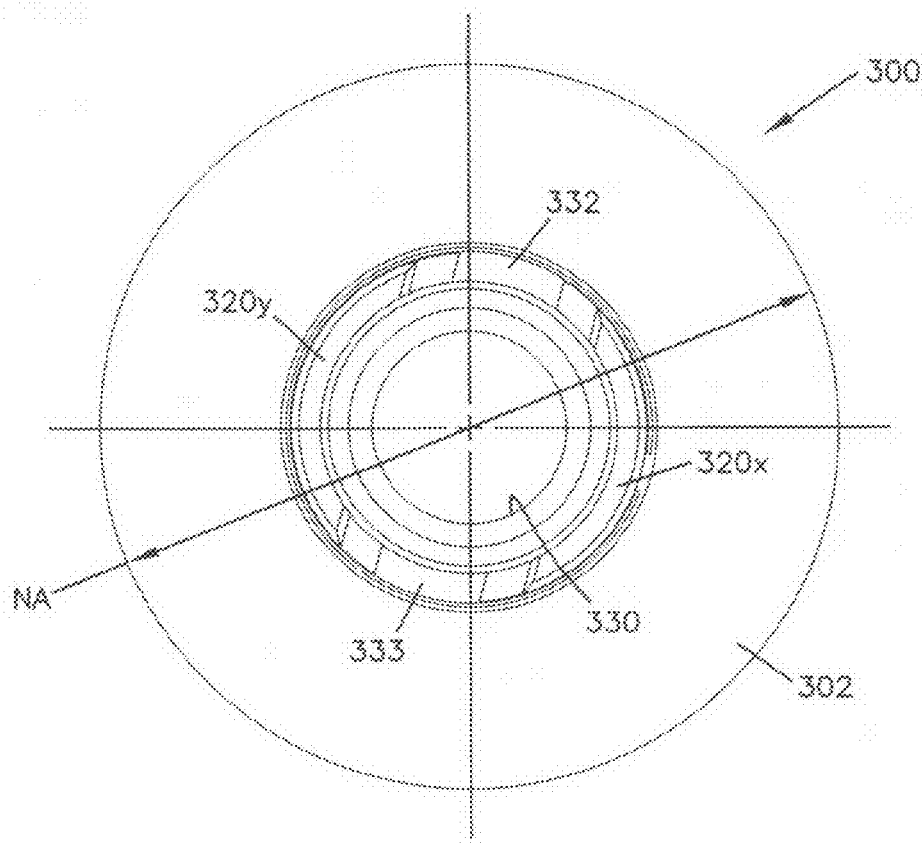
FIG. 21 is a schematic, top plan view of the filter cartridge of FIG. 20.

In FIG. 21, a top plan view of cartridge 300 is depicted. Here, end piece 302 is viewable and can be seen to have an open central, aperture 330. Two rail sections 320x, 320y are viewable. It is noted that each section, 320x, 320y is arcuate, and the two gaps between the rail segments 320x, 320y are shown generally at 332, 333. For the example cartridge 300 depicted, the gaps 332, 333 are each, angularly, the same size, and each is at least 20°.

Figure 22:
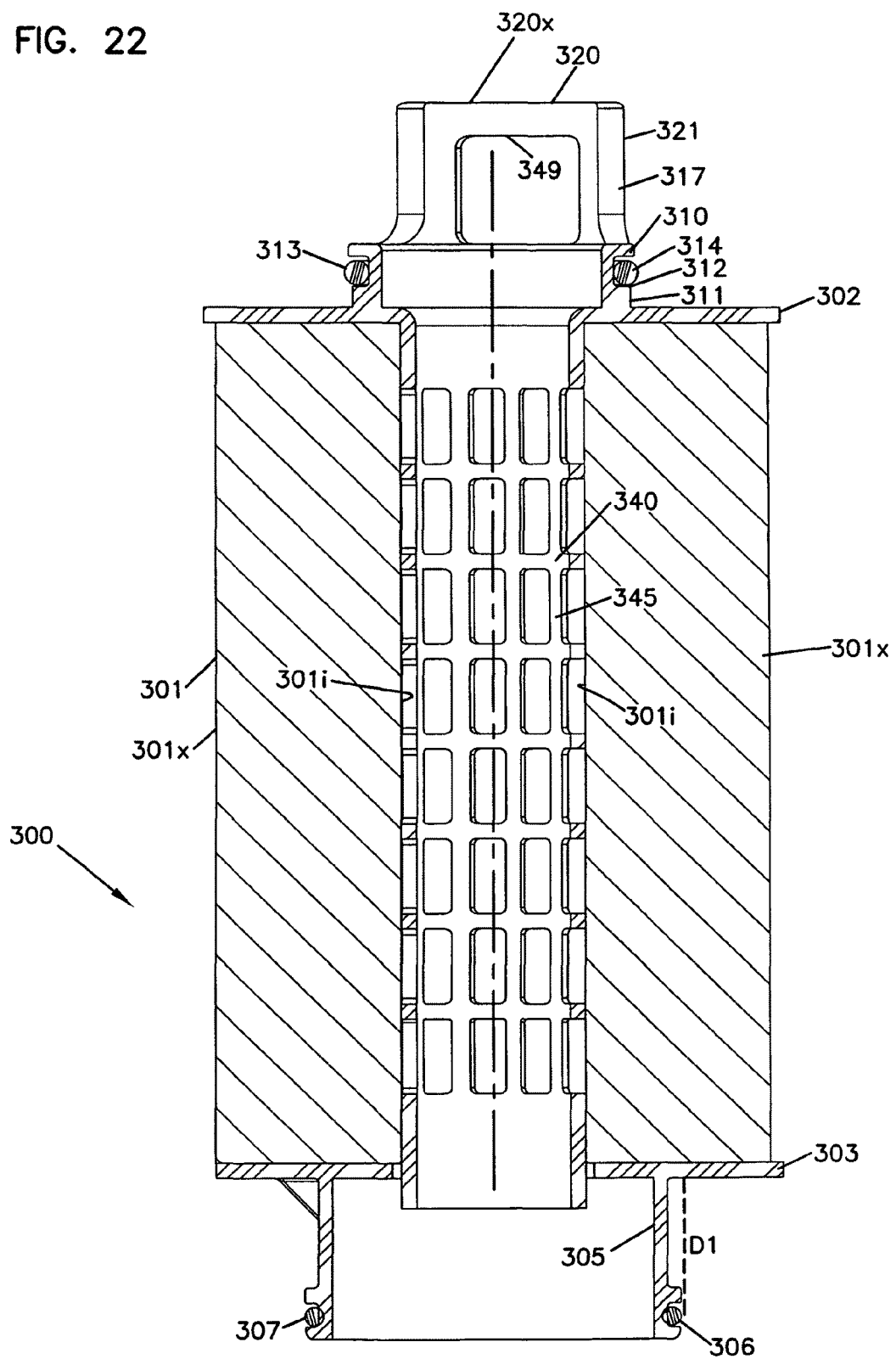
FIG. 22 is a schematic, cross-sectional view of the filter cartridge of FIG. 20.

Attention is now directed to FIG. 22, a cross-sectional view taken generally along line 22-22, FIG. 20. Here media pack 301 can be seen to have an outer perimeter or edge 301x and an inner perimeter or edge 301i. The media pack 301 can be seen to be positioned on a central core support 340, which is perforated to allow gas flow therethrough.

Also, referring to FIG. 22, it can be seen for the example cartridge 300 depicted, the media pack 301 is positioned around a support member 345 comprising: support 340, end piece 302, end piece 303, projection arrangement 305 and projection arrangement 310, as a single, integral, molded piece.

Still referring to FIG. 22, it is noted that seal member 306, comprising o-ring 307, is positioned to axially overlap with the media pack 301 at a location spaced at least 20% and indeed at least 30% of a distance across the media pack 301 between the edges 301x, 301y, from each of the edges 301x, 301y.

Further, it can be seen that the seal arrangement 306 is positioned on projection 305 spaced from end piece 303. Typically, the distance D1 of this spacing would be at least 14 mm, usually at least 18 mm, and typically within the range of 18-40 mm.

Referring still to FIG. 22, it is noted that support arrangement 321 for rail 320 is configured to define apertures 349 under rail 320, for air flow and to facilitate handling.

Figure 23:
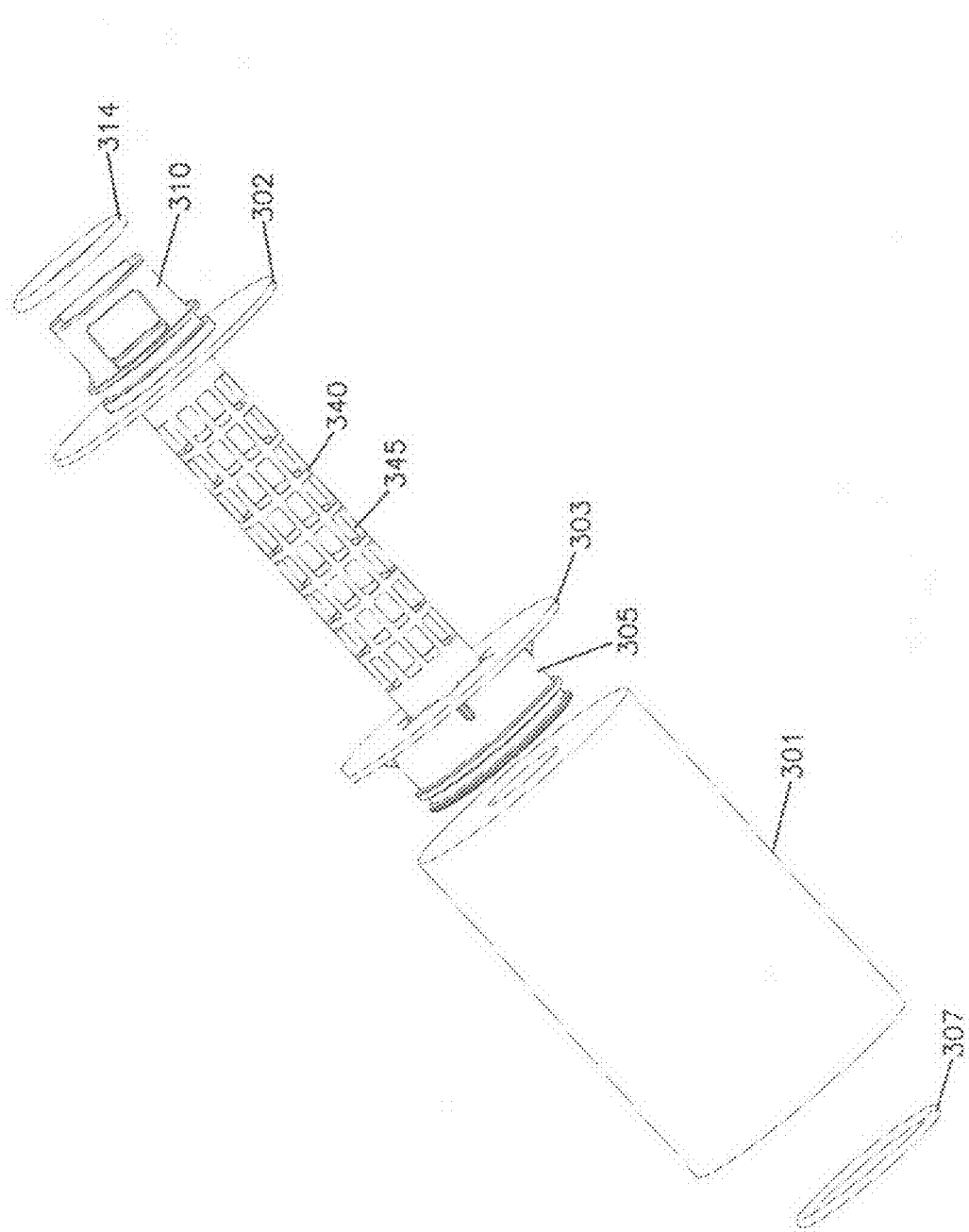
FIG. 23 is a schematic, exploded, perspective view of the filter cartridge of FIG. 20.

In FIG. 23, an exploded perspective view of cartridge 300 is depicted. The various components of cartridge 300 viewable are as follows: o-ring 307; support member 345; media pack 301; and, o-ring 314.

It is noted that the media pack 301 is depicted schematically in the drawings. The media pack 301 could, for example, comprise a coiled wrap of media as characterized herein.

Cartridge 300 can be used analogously to cartridge 5, in an appropriately configured filter assembly. An example filter assembly for use with cartridge 300, is depicted in FIGS. 24-26.

Figure 24:
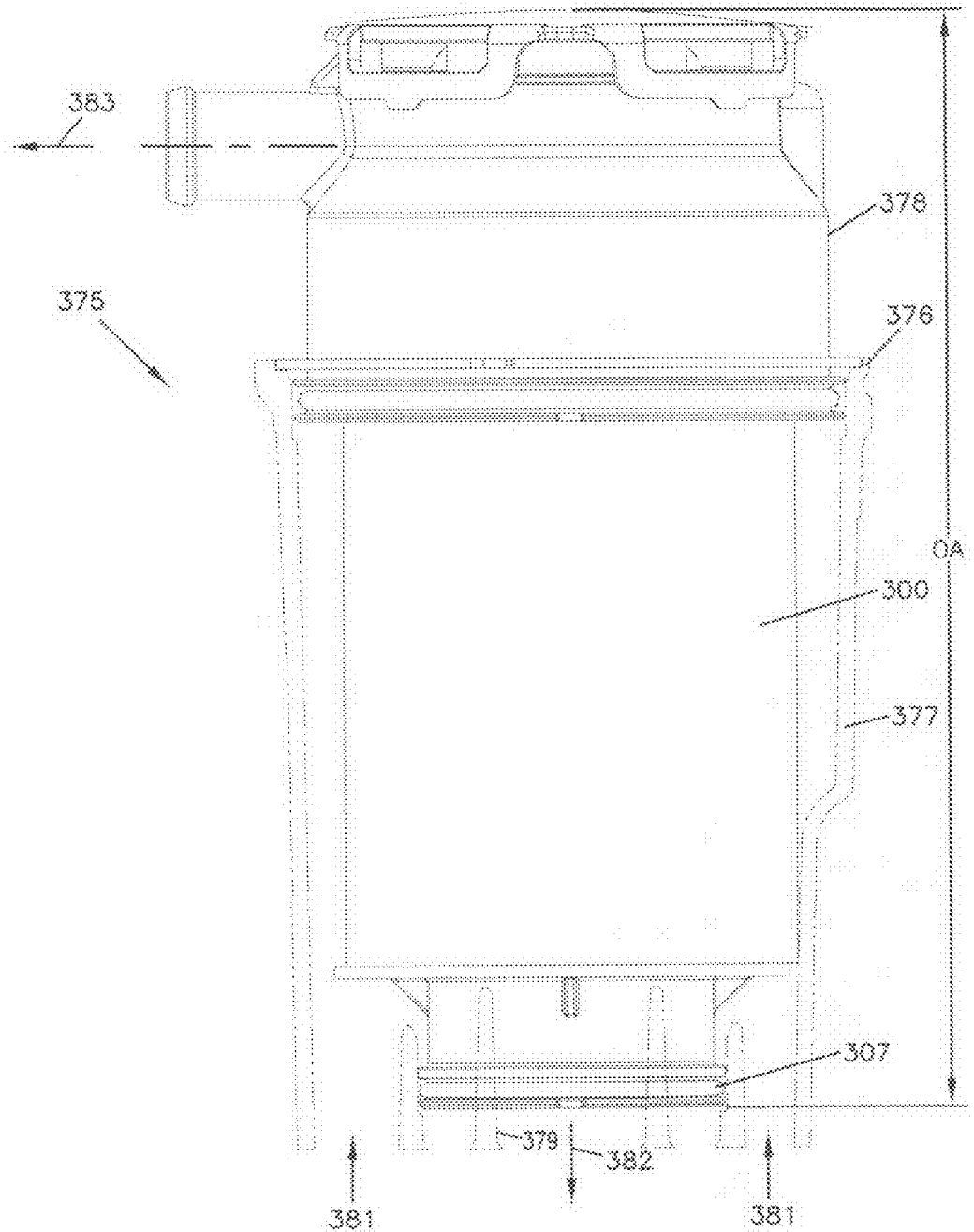
FIG. 24 is a schematic, fragmentary, side elevational view of a filter cartridge in accord with FIG. 20, depicted in association with housing componentry.

Referring first to FIG. 24, cartridge 300 is depicted positioned within a filter assembly 375. The filter assembly 375 depicted, includes a housing 376; and internally received cartridge 300. The housing 376 includes a housing base 377 (depicted in phantom) and a cover assembly or top 378. The housing 376 further includes a liquid drain arrangement 379, also depicted in phantom.

The particular housing 376 depicted, is configured to receive flow of gases to be filtered from a bottom, as generally shown by arrows 381. Liquid drain is generally shown at arrow 382, and filtered gas (air) exit is shown at arrow 383.

Figure 25:
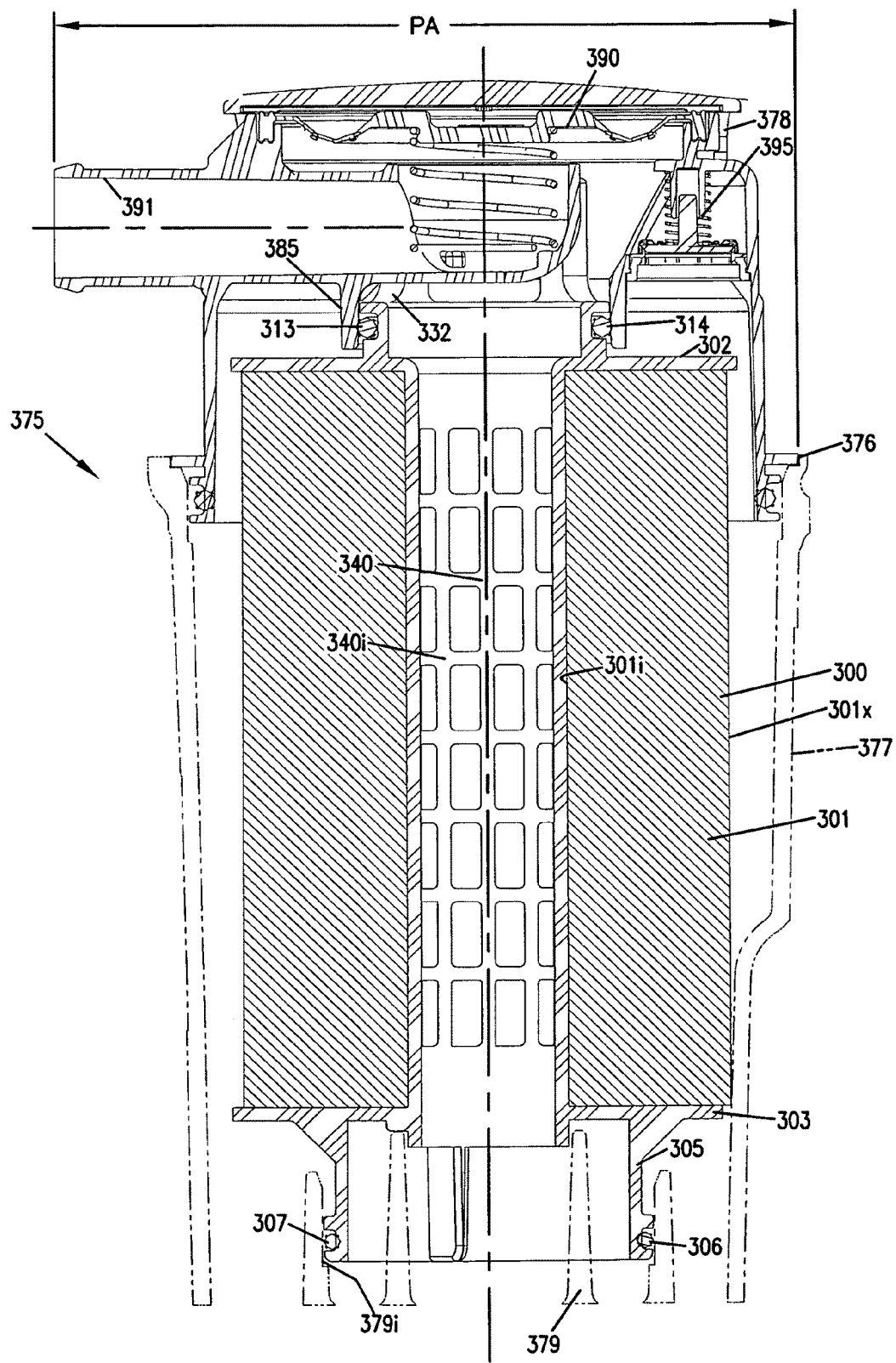
FIG. 25 is a schematic, cross-sectional view of the assembly of FIG. 24.
Figure 26:
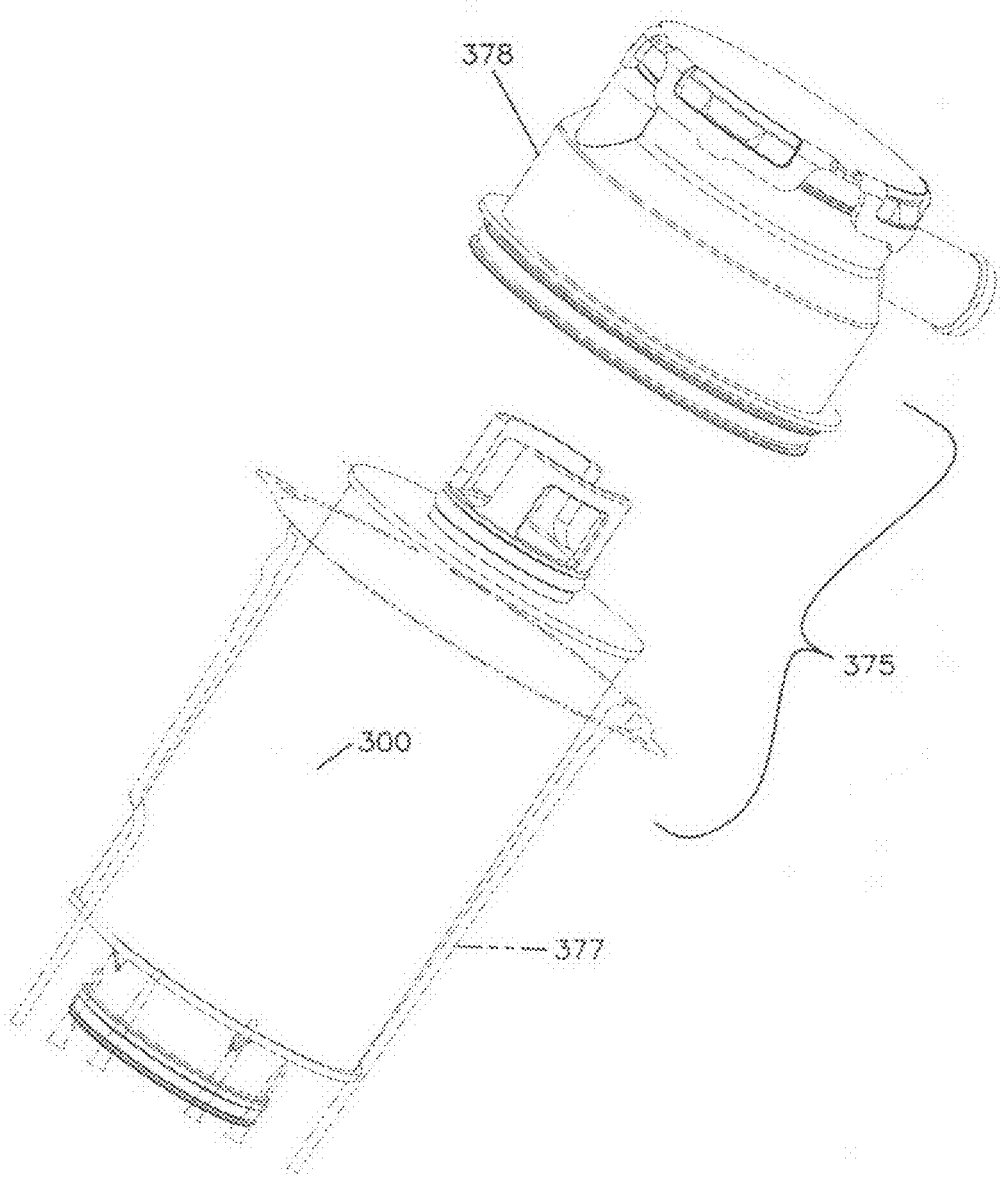
FIG. 26 is a schematic, partially exploded, perspective view of the features of FIG. 24.

Attention is now directed to FIG. 25, a cross-sectional view of assembly 375. Referring to FIG. 25, cartridge 300 can be seen sealed within an interior 376i of housing 376. In particular, seal arrangement 306, on projection 305 is shown sealed against interior surface 379i of drain 379. Seal arrangement 313, i.e. o-ring 314 is shown sealed against an inner flange 385 positioned within cover assembly or top 378.

Referring to FIG. 25, it can be seen that during normal filtering, the gas (air) flow is directed into media pack 301 from an exterior 301x, to an interior 301i. Air flow is then directed to interior 340i of tube 340. The air flow can then move upwardly through tube 340 into top 378. Regulator valve arrangement 390 is provided, to regulate flow of gases. The gases, as regulated by the regulator valve arrangement 390, are passed into outlet arrangement 391. From here, the gases can exit the assembly 375. It is noted that outlet 391 is configured to pass through at least one of the gaps 332, 333, depending on the rotational alignment of cartridge 300 within housing 376.

Assembly 375 also includes a bypass valve assembly 395, for allowing direct gas flow from gas flow inlet to bypass cartridge 300, to reach outlet 391.

In FIG. 26, a partially exploded view of assembly 375 is depicted. From FIG. 26, it will be understood that top 378 can be configured and then be attached, as appropriate, to a housing base 377.

Figure 27:
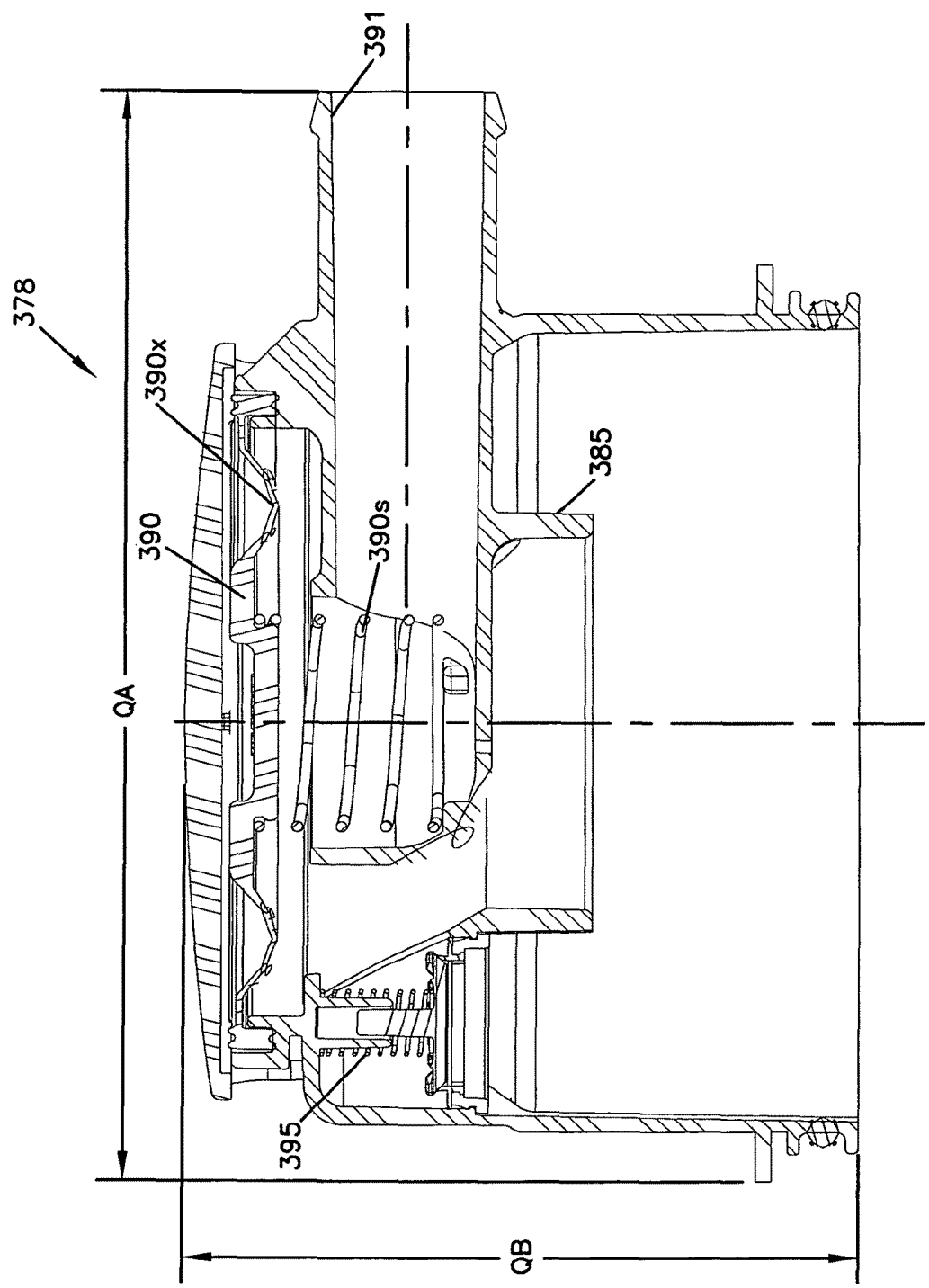
FIG. 27 is a schematic, cross-sectional view of a housing top portion, of the assembly of FIG. 24.

In FIG. 27, a cross-sectional view of top 378 is depicted. Here regulator valve arrangement 390, comprising a diaphragm 390x and spring 390s is viewable.

Figure 28:
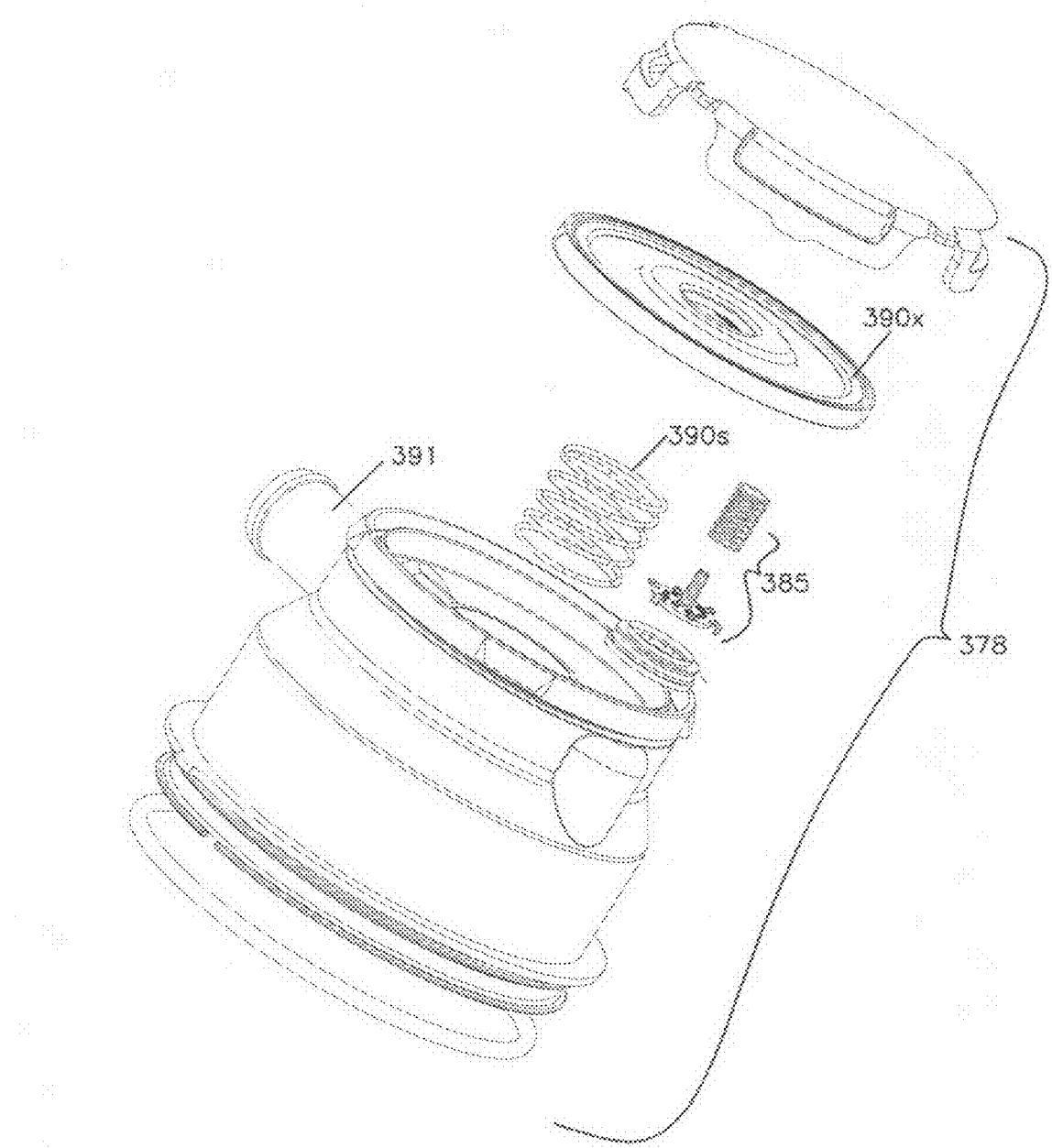
FIG. 28 is a schematic, exploded perspective view of the housing top component of FIG. 27.

In FIG. 28, an exploded perspective view of top 378 is provided.

Figure 29:
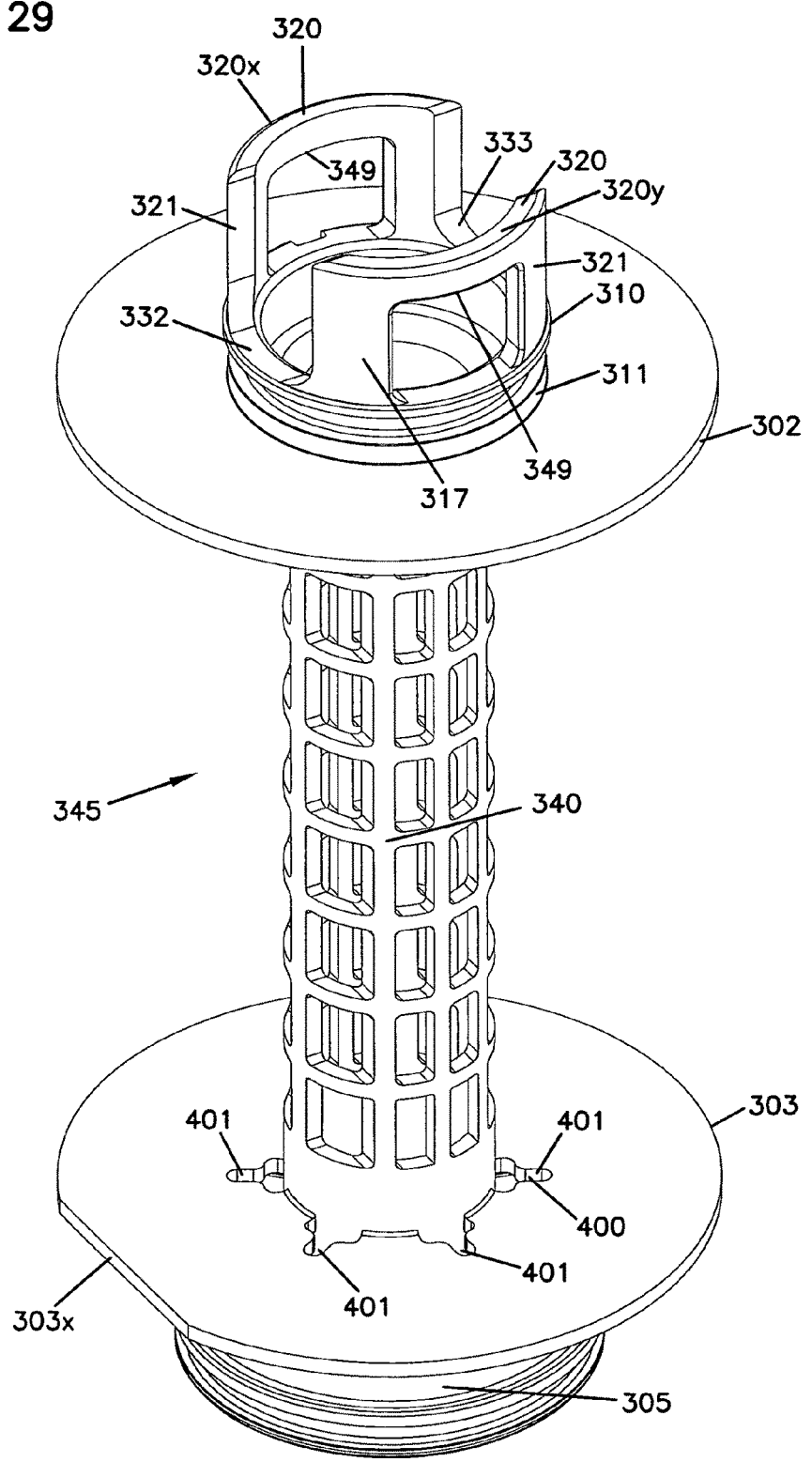
FIG. 29 is a schematic, perspective view of a cartridge component of the cartridge of FIG. 20.
Figure 30:
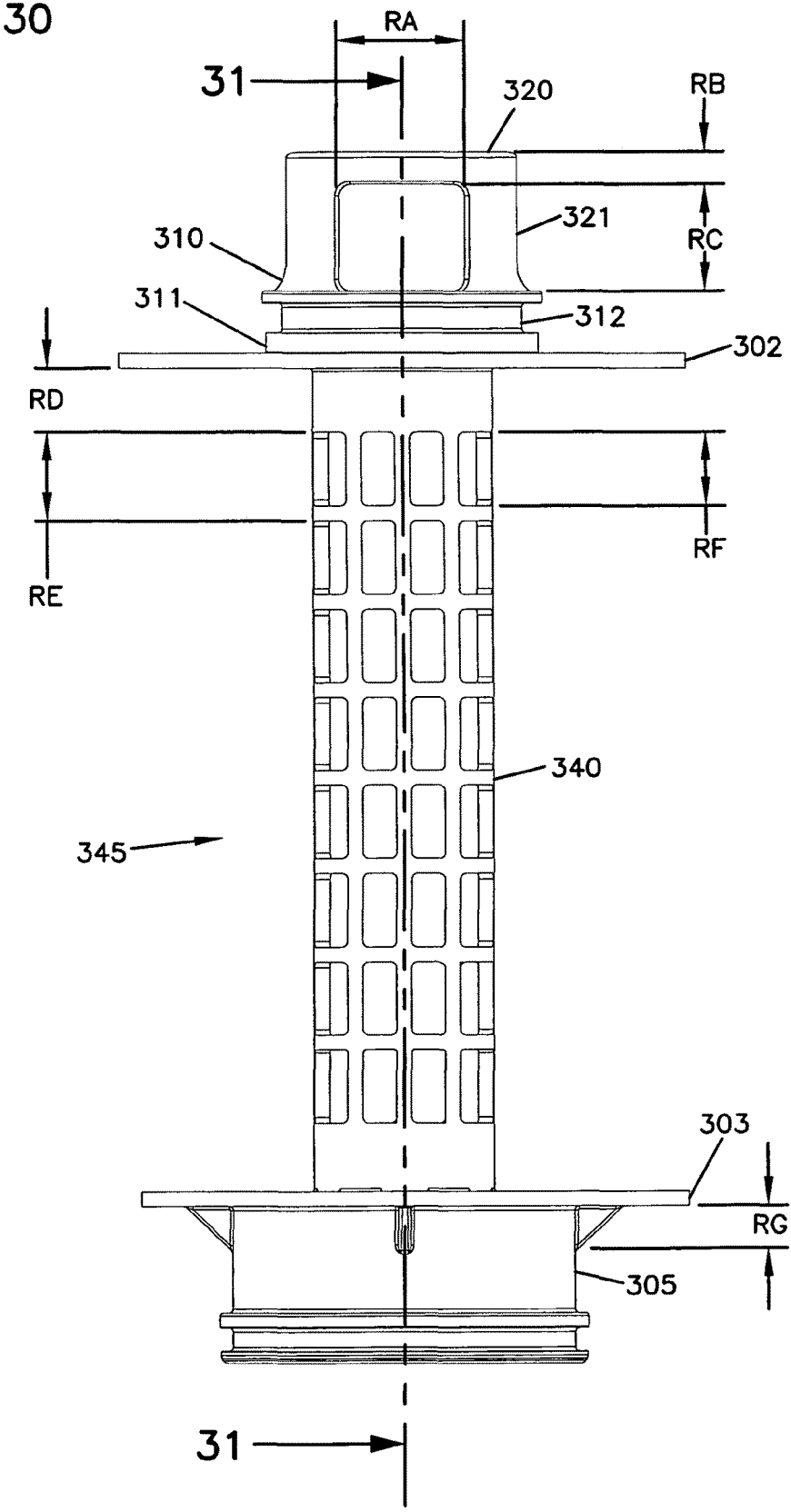
FIG. 30 is a schematic side elevational view of the cartridge component of FIG. 29.
Figure 31:
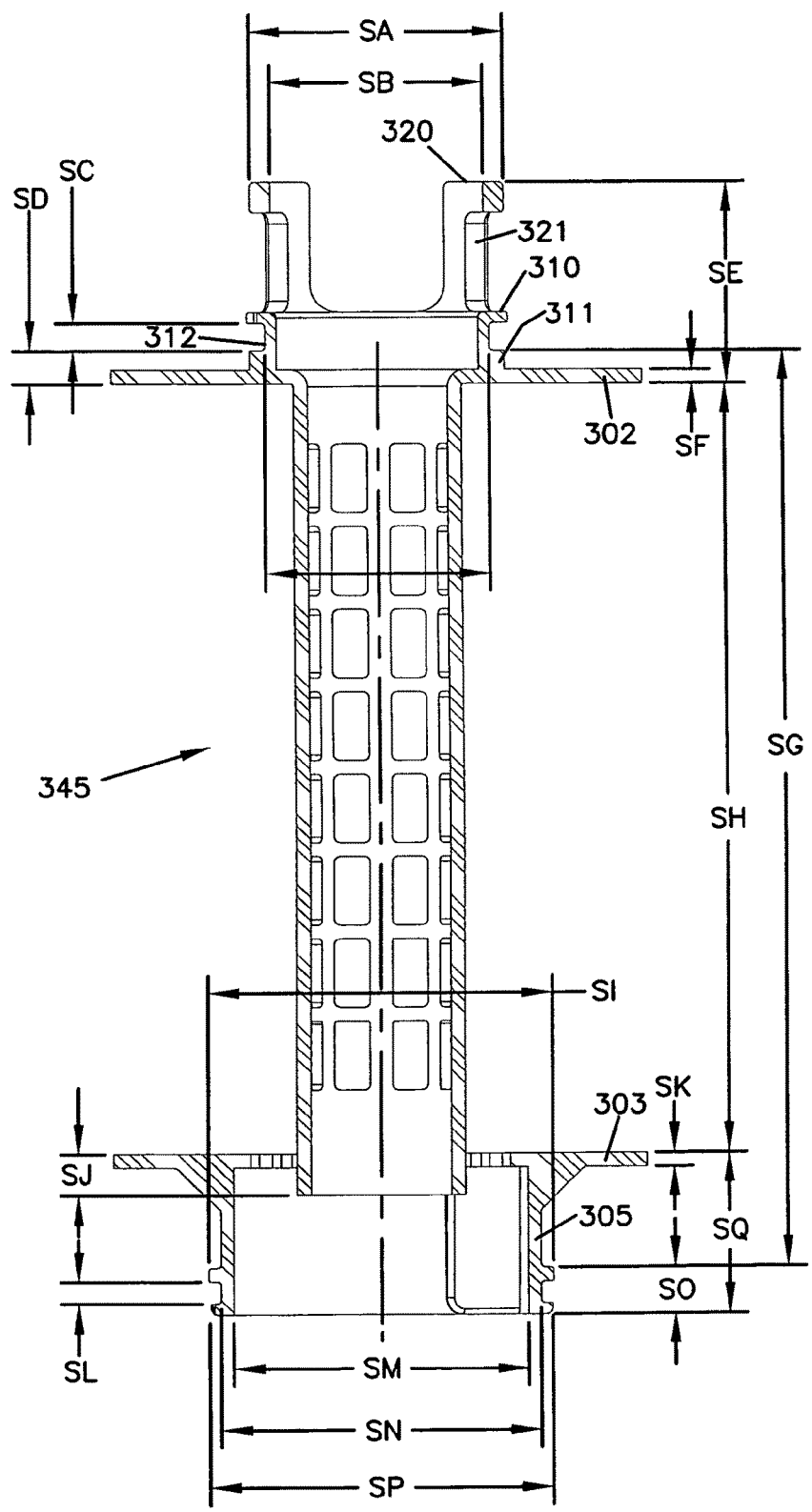
FIG. 31 is a schematic side elevational view of the cartridge component of FIG. 29.

In FIGS. 29-31, various views of support member 345 are provided.

Referring to FIG. 29, support member 345 is viewable comprising support 340, end piece 302, projection arrangement 310, end piece 303, and projection arrangement 305. It is noted that end piece 303 includes aperture arrangement 400 therethrough, in the example comprising individual apertures 401 extending through end piece 303 at a location around, and spaced outwardly from, support 340. Analogously to apertures 143, FIG. 9, aperture arrangement 400 will operate as a drain aperture arrangement, allowing for direct liquid drainage downwardly from the media pack 301, FIG. 22. Thus liquid does not have to flow through tube 340, to reach the housing lower drain 379, although some can.

In FIG. 30, a side elevational view of support 345 is depicted. In FIG. 31, a cross-sectional view of support 345 is provided.

Referring to FIG. 29, it is noted that end piece 303 is not completely circular, but rather has one straight, truncated, section 303x. Truncated section 303x can be configured, in engagement with a portion of a housing, to ensure that the cartridge 300 is in a single rotational orientation, relative to the housing, when installed.

In FIGS. 20-31, some example dimensions are provided as follows: MA=206 mm; NA=94 mm; OA=223.9 mm; PA=138.3 mm; QA=138.3 mm; QB=83.5 mm; RA=21.5 mm; RB=5.5 mm; RC=18 mm; RD=10.9 mm; RE=15 mm; RF=12.5 mm; RG=7.2 mm; SA=45.4 mm; SB=30 mm; SC=5 mm; SD=6 mm; SE=36.5 mm; SF=2.5 mm; SG=166.7 mm; SH=140 mm; SI=61 mm; SJ=7.5 mm; SL=4 mm; SM=52.3 mm; SN=56.7 mm; SO=8.5 mm; SP=60.7 mm; and, SQ=29.2 mm.

It is noted that valve arrangement, generally in accord with that described herein above in connection with previously described figures, can be adapted for use with the cartridge of FIG. 20. It is also noted that the cartridge of FIG. 20 could be incorporated into a housing having features generally in accord with FIGS. 1-3, if the housing were appropriately adapted to accommodate the bottom of the seal arrangements of cartridge 300.

V. Some General Comments and Observations

In general terms, according to one aspect of the present disclosure, a crankcase ventilation filter assembly is provided. The assembly includes a housing defining an interior and including a bowl (or housing base) and a cover assembly. The cover assembly, in one example, includes: an air flow outlet tube, including an inner section; an airflow inlet tube; an internal flange; and, an external flange. In one example the air flow outlet tube and the air flow inlet tube are centered on a single line, which extends generally perpendicular to a center line extending through the bowl and cover assembly, such center line typically being a vertical line in installation, see FIG. 3.

The bowl (or housing base) typically defines an interior and is releasably secured to the cover assembly. The bowl (or housing base) includes a bottom with a liquid drain surrounded by an internal seal flange.

In more general terms, a crankcase ventilation filter assembly is provided which includes a housing having: an air flow inlet; an air flow outlet; and, a liquid drain outlet.

The assembly further includes a filter cartridge removably positioned within the housing interior. The filter cartridge generally comprises: a media pack surrounding an open filter interior; first and second, opposite, end pieces at opposite ends of the filter media; and, first and second seal members.

In an example shown and described, the first end piece includes a first axial projection thereon, on an opposite side of the first end piece from the media pack and extending away from the second end piece. The first axial projection has a first seal support thereon, with a first seal member mounted on first seal support and positioned for sealing engagement with the internal flange of the cover assembly.

In an example shown, the first axial projection includes a framework extending from the first seal support in a direction away from the media. This framework includes an upper rail or rail arrangement supported by a support arrangement, an example shown comprising spaced supports. The upper rail or rail arrangement is positioned at a location above the lower most portion of the inner section of the outlet tube. In one example, the upper rail or rail arrangement is an upper rail in a single piece, having one gap therein. In a second embodiment, the upper rail or rail arrangement comprises two, arcuate, rail sections separated by two gaps.

Also in an example shown, the second end piece includes a second axial projection thereon, on an opposite side of the second end piece from the media pack. The second end axial projection includes a second seal support thereon, with a second seal member mounted on the second seal support and positioned for sealing engagement with appropriate structure, for example the internal sealing flange of the bowl or housing bottom, i.e. to surround and define a liquid drain outlet.

In general terms, the housing and filter cartridge are configured such that: crankcase ventilation gases directed into the housing are directed into an annular region inside the housing and around the filter cartridge; then through the media to the central interior; then outwardly from the filter cartridge through the first end piece; then into the inner section of the outlet tube; and, then outwardly from the filter assembly. In addition, the housing and filter cartridge are configured such that liquid coalesced within the media pack can drain to the liquid drain, through the liquid drain and outwardly from the filter assembly.

In an example depicted, as the crankcase ventilation gases are directed into the housing, they are directed into a volume between internal and external flanges of a cover assembly, before being directed into an annular region inside the housing, and around the filter cartridge.

In an example shown and described, the filter cartridge includes a check valve therein comprising a valve member and first and second valve seats. The valve member can comprise a ball, positioned within the open filter interior. In a typical arrangement, the crankcase ventilation filter assembly includes a support positioned within open filter interior, with the ball positioned therein.

In such arrangements, the first valve seat is positioned adjacent to the first end piece. The valve member, when positioned against the first valve seat, closes the valve seat to flow of liquid therethrough. By this is not necessarily meant that the valve seat is fully "sealed" but rather that liquid flow through the first valve seat is substantially inhibited. The first valve seat would typically be located in the first end piece. Thus the valve member (i.e. the valve ball) would not rest against the first valve seat unless a vehicle having the crankcase ventilation filter assembly mounted thereon, had flipped (rollover). As a result of the construction described, the check valve assembly protects the engine against liquid draining therein, in a rollover condition.

The second valve seat is positioned adjacent the second end piece; and, the valve member when positioned against the second valve seat, does not close the second valve seat to liquid flow therethrough. This would be a normal condition for the assembly, in use with an engine operating. The valve member, typically a valve ball, rests on the second valve seat. This does not, however, close the valve seat to drain of liquid therethrough, during normal operation.

In one example, the crankcase ventilation assembly is configured such that the upper rail of the framework is c-shaped (arcuate shaped), and includes a single gap therethrough, although alternatives are possible. When the upper rail is c-shaped with a single gap therethrough, the gap typically has an arcuate extension of no more than 60° and least 20°, typically within the range of 30°-60°, inclusive. In an example embodiment in which the upper rail comprises two arcuate sections, spaced by two gaps, each gap is typically at least 20° and not more than 60°.

In an example described, the first end piece of the filter cartridge includes an outer periphery with a plurality of spaced, radially outwardly projecting, projections thereon.

In an example assembly, the cover assembly includes an outer flange with a shoulder positioned above, typically pressing against, these, spaced, radially outwardly projecting, projections, on the first end piece. This helps secure the cartridge in operating position.

In another example, the second end piece of the filter cartridge is generally circular, except it has one straight, truncated, section therein.

Other features described and shown herein relate to a regulation valve assembly in the cover assembly; and, a relief assembly in the cover assembly. Further, a projection arrangement from the second end piece of the cartridge, positioned to engage an upward projection arrangement on a bottom of the bowl, is described.

In another aspect of the present disclosure, filter cartridge for use in a crankcase ventilation filtration arrangement is described. The filter cartridge comprises a media pack surrounding an open filter interior, a central media support tube surrounded by the media pack, first and second seal members, and first and second end pieces positioned with the media pack therebetween. In example described, the central media support tube and first and second end pieces comprise portions of a single integral molded piece.

In a typical example filter cartridge, the second end piece has an outer perimeter and includes a central aperture therethrough in communication with the open filter interior. Further, the second end piece includes a second seal support thereon projecting in a direction away from the first end piece. The second seal support on the second end piece supports the second seal member for sealing at a location: spaced across the second end piece at least 20% of a distance across the second end piece from the outer perimeter toward the central recess. Further, it is typically spaced at least 20% of a distance across the second end piece from the central aperture toward the outer perimeter. (Usually it is also spaced in overlap with the media pack at least 20% across the media pack from both inner and outer edges of the media pack).

In a typical example, the second end piece is an end piece of the filter cartridge directed downwardly, in typical use.

Also in a typical example filter cartridge arrangement according to an aspect described herein, the first end piece includes a first axial projection thereon, extending in a direction away from the second end piece. The first end piece includes an outer perimeter and a central aperture. The first axial projection includes a base section with a first seal member mounted thereon: i.e. the base section operates as a seal support. Further, first axial projection includes a framework having a rail arrangement and rail support arrangement. The rail arrangement and rail support arrangement are typically positioned to support the seal arrangement spaced across the first end piece from the outer perimeter a distance corresponding at least 20% of the distance from the outer perimeter toward the central aperture. Further, the seal arrangement on the first partial projection is analogously positioned In addition, the rail arrangement and rail support arrangements are typically positioned at least 20% of the distance across the first end piece from the central aperture toward the outer perimeter. Further, the seal support is typically is analogously positioned. Also, typically each of the support and seal are positioned in overlap with the media pack at a location spaced across the media pack at least 20% (of a distance across the media pack) from both inner and outer edges of the media pack.

In one arrangement, a rail member of the framework has a c-shape, usually with a single gap therein (at an open end of the c). In example, the gap in the c-shape extends over a radial arc of at least 20°, usually not more than 60° and often within the range of 30°-60°, inclusive. In a second embodiment, the rail or rail arrangement comprises two arcuate rail sections, spaced by two gaps; each gap being at least 20° and typically not more than 60°.

In examples described, the second end piece includes a drain aperture arrangement therethrough, in direct drain overlap with an end of the media pack. Typically the drain aperture arrangement includes one or more drain apertures each of which is positioned spaced from an outer perimeter of the second piece by at least 40% of the distance from the outer perimeter of the second end piece toward the central aperture of the second end cap; and in overlap with the media pack at least 40% thereacross from an outer edge toward an outer edge. In a typical example in which the assembly includes a support tube, the drain aperture arrangement can comprise one or more apertures adjacent to, and generally radially outwardly from, the support tube. In examples shown, the portion of support tube adjacent to which the aperture arrangement is positioned, is an impermeable section of the support tube.

In example filter cartridge arrangements described, the second end piece will be orientated directed downwardly during normal installation. The second end piece can further include a projection arrangement thereon, directed downwardly, for example in the form of hook or snap fit members.

In an example, the filter cartridge further includes a check valve therein, comprising a first valve seat, a second valve seat and a valve member. The second valve seat is typically adjacent to the second end piece and the first valve seat is typically adjacent to the first end piece. The valve member is typically oriented to close the first valve seat to passage of liquid therethrough, when positioned thereagainst; and, to not close the first valve seat, when positioned thereagainst. In operation of the assembly, the check valve arrangement operates to provide some roll over protection to the engine, when the assembly is installed. In an example described, the valve member is a ball. Further, the first valve seat typically comprises a end member snap fit to the central aperture of the first end piece.

In another aspect to the present disclosure, a filter cartridge for crankcase ventilation filtration is provided. The filter cartridge comprises a media surrounding an open filter interior, and further includes a central media support tube surrounded by the media pack and having first and second ends. First and second end pieces are positioned with the media pack therebetween. The first and second end pieces can be formed integral with a central media support. A check valve arrangement is included in the filter cartridge, having a first valve seat, a second valve seat and a valve member. The first valve seat is positioned adjacent to a first end of the central media support tube, the second valve is positioned adjacent to a second end of the central media support tube and the valve member is positioned within the central media support tube. The valve member is configured and positioned in a manner removably between the first and second valve seats. The first valve seat is configured so that when the valve member is seated thereto, the valve seat is closed to flow of liquid therethrough. Further, the second valve seat is configured so that when the valve member is seated thereto, the second valve seat is not closed to the passage of liquid therethrough. When oriented in this manner, the check valve arrangement operates to protect the vehicle during rollover, from liquid draining thereto from the filter cartridge.

In a typical example, the valve may compromise a ball. Also in a typical example, the first valve seat comprises a seat member snap fit to the first end piece.

In a another aspect to the present invention, a crankcase ventilation filter assembly is provided. The assembly comprises a housing having an interior, for example, defining a bowl (housing base) and a cover assembly. The cover assembly includes an air flow outlet tube, including an inner section; an optional air flow inlet tube; an internal flange; and, and an external flange. Typically the bowl (housing base) defines an interior and is releasably secured to the cover assembly, for example with a threaded arrangement. The bowl (housing base) includes a bottom with a liquid drain surrounded by an internal flange. The air flow inlet can be positioned in an alternate location form the cover assembly.

A filter cartridge as previously described can be operably positioned in the housing interior with first valve seat adjacent from the cover assembly; and, with a second valve seat remote from the cover assembly.

It is noted that a number of additional specific example features are described herein, for use in association with assemblies and components as characterized. It is further noted that an arrangement does not need to include all of the features characterized herein, to obtain some advantage according the present disclosure. Methods of use are also described.

What is claimed is:

1. A crankcase ventilation filter assembly comprising:
   (a) a housing defining an interior and including an air flow inlet and an air flow outlet;
      (i) the housing including a cover assembly including: an air flow outlet tube, including an inner section; an internal flange; and, an external flange; and,
      (ii) the housing including a housing bottom section defining an interior and being releasably secured to the cover assembly; the bottom section including a bottom with a liquid drain surrounded by an internal seal flange; and,
   (b) a filter cartridge separate from the housing and removably positioned within the housing interior; the filter cartridge comprising: a media pack surrounding an open filter interior; first and second, opposite, end pieces; and, first and second seal members;
      (i) the first end piece having a first axial projection thereon, on an opposite side of the first end piece from the media pack;
         (A) the first axial projection including a first seal support thereon, with the first seal member mounted on the first seal support and positioned in sealing engagement with the internal flange of the cover assembly; and,
         (B) the first axial projection including a framework extending from the first seal support in a direction away from the media pack; the framework including an upper rail supported by spaced supports; the upper rail being positioned at a location above a lower most portion of the inner section of the outlet tube; and,
      (ii) the second end piece having a second axial projection thereon, on an opposite side of the second end piece from the media pack;
         (A) the second axial projection including a second seal support thereon, with the second seal member mounted on the second seal support and positioned in sealing engagement with the internal sealing flange in the housing bottom section;
   (c) the housing and filter cartridge being configured such that:
      (i) crankcase ventilation gases directed into air flow inlet are directed: into an annular region inside the housing and around the filter cartridge; then through the media to the central interior; then outwardly from the filter cartridge through the first end piece; then into the inlet section of the outlet tube; and then outwardly from the assembly; and,
      (ii) liquid coalesced within the media pack can drain to the liquid drain through the liquid drain and outwardly from the filter assembly.

2. A crankcase ventilation filter according to claim 1 wherein:
   (a) the housing includes a bowl and a cover assembly;
      (i) the cover assembly includes: an air flow outlet tube, including an inner section; an air flow inlet tube; an internal flange; and, an external flange; and,
      (ii) the bowl defines an interior and is releasably secured to the cover assembly; the bowl including a bottom with a liquid drain surrounded by an internal seal flange; and,
   (b) the housing is configured such that crankcase ventilation gases directed into the air flow inlet tube are directed: into a volume between the internal and external flanges of the cover assembly; into an air flow region inside the bowl and around the filter cartridge; then through the media into the central interior; then outwardly from the filter cartridge through the end piece; then into the inlet section of the outlet tube; and then outwardly from the assembly.

3. A crankcase ventilation filter assembly according to claim 1 wherein:

(a) the filter cartridge includes a check valve therein comprising a valve member and first and second valve seats;
  (i) the first valve seat being positioned adjacent the first end piece;
  (ii) the valve member, when positioned against the first valve seat, closing the first valve seat to flow of liquid therethrough;
  (iii) the second valve seat being positioned adjacent the second end piece; and,
  (iv) the valve member, when positioned against the second valve seat, not closing the second valve seat to liquid flow therethrough.

4. A crankcase ventilation filter assembly according claim 1 wherein:
(a) the upper rail on the framework is c-shaped.

5. A crankcase ventilation filter assembly according to claim 4 wherein:
(a) the c-shaped upper rail includes a single gap therein having an arcuate extension of no more than 60° and at least 20°.

6. A crankcase ventilation filter assembly according to claim 1 wherein:
(a) the first end piece of the filter cartridge includes an outer periphery with a plurality of spaced, radially outwardly projecting, projections thereon; and,
(b) the cover assembly outer flange includes a shoulder pressing against the spaced, radially outwardly projecting, projections of the first end piece.

7. A crankcase ventilation filter assembly according to claim 1 wherein:
(a) the first seal member is mounted on the first seal support in radially outwardly directed sealing engagement with a surrounding portion of the internal flange of the cover assembly;
  (i) the first seal member having a smaller outer dimension than an outer perimeter of the media pack; and,
(b) the second seal member is mounted on the second seal support and is positioned in radially outwardly directed sealing engagement with a surrounding portion of the internal sealing flange in the housing bottom section;
  (i) the second seal member having a smaller dimension than an outer perimeter of the media pack.

8. A filter cartridge, for crankcase ventilation filtration, comprising:
(a) a media pack surrounding an open filter interior;
(b) a central media support tube surrounded by the media pack;
(c) first and second seal members; and,
(d) first and second end pieces positioned with the media pack therebetween;
  (i) the second end piece having an outer perimeter and including a central aperture therethrough in communication with the open filter interior;
  (ii) the second end piece including a second seal support thereon projecting in a direction away from the first end piece; the second seal support on the second end piece supporting the second seal member at a location: spaced across the second end cap at least 20% of a distance across the second end piece from the outer perimeter toward the central recess; and, spaced at least 20% of a distance across the second end piece from the central aperture toward the outer perimeter; and,
  (ii) the first end piece including a first axial projection thereon extending in a direction away from the second end piece;
    (A) the first end piece including an outer perimeter and central aperture;
    (B) the first axial projection including a base section with the first seal member thereon; and,
    (C) the first axial projection including a framework having a rail and a rail support arrangement; the rail and rail support arrangement being positioned spaced across the first end piece from the outer perimeter a distance corresponding to at least 20% of a distance from the outer perimeter toward the central aperture.

9. A filter cartridge according to claim 8 wherein:
(a) the rail of the framework has a c-shape.

10. A filter cartridge according to claim 9 wherein:
(a) the rail has a c-shape with a single opening therein extending over a radial arc of at least 20°.

11. A filter cartridge according to claim 10 wherein:
(a) the rail has a c-shape with an opening therein extending over a radial arc within the range of 30°-60°, inclusive.

12. A filter cartridge according to claim 11 wherein:
(a) each gap in upper rail arrangement has an arcuate extension of at least 20°.

13. A filter cartridge according to claim 8 wherein:
(a) the second end cap includes a drain aperture arrangement therethrough, in overlap with an end of the media pack.

14. A filter cartridge according to claim 13:
(a) the rail on the framework comprises two arcuate sections spaced by two gaps.

15. A filter cartridge according to claim 13 wherein:
(a) the drain aperture arrangement in the second end cap is spaced from the outer perimeter of the second end cap at least 40% of a distance from an outer perimeter of the second end cap to a central aperture of the second end cap.

16. A filter cartridge according to claim 8 including:
(a) a check valve arrangement therein comprising a first valve seat, a second valve seat and valve member;
  (i) the second valve seat being adjacent to the second end piece; and,
  (ii) the valve member not closing the second valve seat when positioned thereagainst, but closing the first valve seat, when positioned thereagainst.

17. A filter cartridge according to claim 16 wherein:
(a) the valve member is a ball.

18. A filter cartridge according to claim 8 wherein:
(a) the second seal member surrounds the second seal support to define a radially outwardly directed seal; and,
(b) the first seal member surrounds the base section.

19. A filter cartridge, for crankcase ventilation filtration, comprising:
(a) a media pack surrounding an open filter interior;
(b) a central media support tube surrounded by the media pack and having first and second ends;
(c) first and second end pieces positioned with the media pack therebetween; and,
(d) a check valve arrangement positioned within the filter cartridge at a location surrounded by the media; the check valve arrangement including a first valve seat, a second valve seat and a valve member;
  (i) the first valve seal being positioned adjacent a first end of the central media support tube;
  (ii) the second valve seal being positioned adjacent the second end of the central media support tube; and,
  (iii) the valve member being positioned within the central media support tube, and movable between the first and second valve seats;

(A) the first valve seat being configured so that when the valve member is seated thereto, the first valve seat is closed to flow of liquid therethrough; and,
(B) the second valve seat being configured so that when the valve member is seated thereto, the second valve seat is not closed to the passage of liquid therethrough.

20. A filter cartridge according to claim 19 wherein:
(a) the first valve seat comprises a portion of an end member snap fit in a central aperture of the first end piece.

21. A filter cartridge according to claim 19 wherein:
(a) the first valve seat comprises an end member snap fit to the first end piece.

* * * * *